US008285725B2

(12) United States Patent  
Bayliss

(10) Patent No.: US 8,285,725 B2  
(45) Date of Patent: Oct. 9, 2012

(54) SYSTEM AND METHOD FOR IDENTIFYING ENTITY REPRESENTATIONS BASED ON A SEARCH QUERY USING FIELD MATCH TEMPLATES

(75) Inventor: David Alan Bayliss, Delray Beach, FL (US)

(73) Assignee: LexisNexis Risk & Information Analytics Group Inc., Boca Raton, FL (US)

(*) Notice: Subject to any disclaimer, the term of this patent is extended or adjusted under 35 U.S.C. 154(b) by 224 days.

(21) Appl. No.: 12/496,876

(22) Filed: Jul. 2, 2009

(65) Prior Publication Data

US 2010/0005078 A1 Jan. 7, 2010

Related U.S. Application Data

(60) Provisional application No. 61/077,676, filed on Jul. 2, 2008.

(51) Int. Cl.  
G06F 17/30 (2006.01)  
G06F 7/00 (2006.01)

(52) U.S. Cl. .................. 707/748; 707/769; 707/779

(58) Field of Classification Search .................. None  
See application file for complete search history.

(56) References Cited

U.S. PATENT DOCUMENTS

| | | |
|---|---|---|
| 4,543,630 A | 9/1985 | Neches |
| 4,769,772 A | 9/1988 | Dwyer |
| 4,860,201 A | 8/1989 | Stolfo et al. |
| 4,870,568 A | 9/1989 | Kahle et al. |
| 4,925,311 A | 5/1990 | Neches et al. |
| 5,006,978 A | 4/1991 | Neches |
| 5,146,590 A | 9/1992 | Lorie et al. |
| 5,251,131 A | 10/1993 | Masand et al. |
| 5,276,899 A | 1/1994 | Neches |
| 5,303,383 A | 4/1994 | Neches et al. |
| 5,392,430 A | 2/1995 | Chen et al. |
| 5,408,649 A | 4/1995 | Beshears et al. |
| 5,423,037 A | 6/1995 | Hvasshovd |
| 5,457,797 A | 10/1995 | Butterworth et al. |
| 5,471,622 A | 11/1995 | Eadline |
| 5,495,606 A | 2/1996 | Borden et al. |
| 5,551,027 A | 8/1996 | Choy et al. |
| 5,551,066 A | 8/1996 | Stillman et al. |
| 5,555,404 A | 9/1996 | Torbjørnsen et al. |
| 5,590,284 A | 12/1996 | Crosetto |
| 5,590,319 A | 12/1996 | Cohen et al. |
| 5,640,485 A | 6/1997 | Ranta |
| 5,655,080 A | 8/1997 | Dias et al. |
| 5,692,174 A | 11/1997 | Birely et al. |
| 5,694,593 A | 12/1997 | Baclawski |

(Continued)

OTHER PUBLICATIONS

International Search Report and Written Opinion mailed Aug. 13, 2009, for International Application No. PCT/US09/41649.

(Continued)

*Primary Examiner* — Charles Kim  
*Assistant Examiner* — Miranda Huang  
(74) *Attorney, Agent, or Firm* — Mark Lehi Jones; Troutman Sanders LLP

(57) ABSTRACT

Disclosed is a system for, and method of, identifying a universal entity representation in an electronic universal database that corresponds to a foreign entity representation in an electronic foreign database, each entity representation including a plurality of linked records, each record including a plurality of fields, each field capable of containing a field value, each field value associated with a field value weight.

22 Claims, 11 Drawing Sheets

U.S. PATENT DOCUMENTS

| | | | |
|---|---|---|---|
| 5,715,469 A | 2/1998 | Arning | |
| 5,732,400 A | 3/1998 | Mandler et al. | |
| 5,745,746 A | 4/1998 | Jhingran et al. | |
| 5,754,841 A | 5/1998 | Carino | |
| 5,758,314 A | 5/1998 | Mckenna | |
| 5,799,323 A | 8/1998 | Mosher et al. | |
| 5,845,113 A | 12/1998 | Swami et al. | |
| 5,857,180 A | 1/1999 | Hallmark et al. | |
| 5,878,408 A | 3/1999 | Van Huben et al. | |
| 5,884,299 A | 3/1999 | Ramesh et al. | |
| 5,890,159 A | 3/1999 | Sealby et al. | |
| 5,897,638 A | 4/1999 | Lasser et al. | |
| 5,905,904 A | 5/1999 | Bird et al. | |
| 5,970,495 A | 10/1999 | Baru et al. | |
| 5,983,228 A | 11/1999 | Kobayashi et al. | |
| 6,006,249 A | 12/1999 | Leong | |
| 6,026,394 A | 2/2000 | Tsuchida et al. | |
| 6,026,398 A | 2/2000 | Brown et al. | |
| 6,081,801 A | 6/2000 | Cochrane et al. | |
| 6,108,763 A | 8/2000 | Grondalski | |
| 6,115,713 A | 9/2000 | Pascucci et al. | |
| 6,192,391 B1 | 2/2001 | Ohtani | |
| 6,199,069 B1 | 3/2001 | Dettinger et al. | |
| 6,256,621 B1 | 7/2001 | Tsuchida et al. | |
| 6,266,804 B1 | 7/2001 | Isman | |
| 6,304,882 B1 | 10/2001 | Strellis et al. | |
| 6,311,169 B2 | 10/2001 | Duhon | |
| 6,330,552 B1 | 12/2001 | Farrar et al. | |
| 6,374,241 B1 | 4/2002 | Lamburt et al. | |
| 6,377,959 B1 | 4/2002 | Carlson | |
| 6,389,429 B1 * | 5/2002 | Kane et al. | 707/609 |
| 6,424,973 B1 | 7/2002 | Baclawski | |
| 6,426,947 B1 | 7/2002 | Banker et al. | |
| 6,427,148 B1 | 7/2002 | Cossock | |
| 6,430,552 B1 | 8/2002 | Corston-Oliver | |
| 6,490,592 B1 | 12/2002 | St. Denis et al. | |
| 6,510,428 B2 | 1/2003 | Tsuchida et al. | |
| 6,523,019 B1 | 2/2003 | Borthwick | |
| 6,523,041 B1 | 2/2003 | Morgan et al. | |
| 6,546,403 B1 | 4/2003 | Carlson et al. | |
| 6,567,806 B1 | 5/2003 | Tsuchida et al. | |
| 6,658,412 B1 | 12/2003 | Jenkins et al. | |
| 6,785,370 B2 | 8/2004 | Glowny et al. | |
| 6,816,854 B2 | 11/2004 | Reiner et al. | |
| 6,963,871 B1 | 11/2005 | Hermansen et al. | |
| 6,968,335 B2 | 11/2005 | Bayliss et al. | |
| 6,983,317 B1 | 1/2006 | Bishop et al. | |
| 6,990,503 B1 | 1/2006 | Luo et al. | |
| 7,152,060 B2 | 12/2006 | Borthwick et al. | |
| 7,185,003 B2 | 2/2007 | Bayliss et al. | |
| 7,240,059 B2 | 7/2007 | Bayliss et al. | |
| 7,293,024 B2 | 11/2007 | Bayliss et al. | |
| 7,333,998 B2 | 2/2008 | Haeckerman et al. | |
| 7,403,942 B1 | 7/2008 | Bayliss et al. | |
| 7,752,064 B2 | 7/2010 | Kauffman | |
| 7,912,842 B1 | 3/2011 | Bayliss | |
| 2001/0013049 A1 | 8/2001 | Ellis, III | |
| 2001/0014888 A1 | 8/2001 | Tsuchida et al. | |
| 2002/0007284 A1 | 1/2002 | Schurenberg et al. | |
| 2002/0065870 A1 | 5/2002 | Baehr-Jones et al. | |
| 2002/0073099 A1 | 6/2002 | Gilbert et al. | |
| 2002/0073138 A1 | 6/2002 | Gilbert et al. | |
| 2002/0156793 A1 | 10/2002 | Jaro | |
| 2002/0184222 A1 | 12/2002 | Kohut et al. | |
| 2003/0013951 A1 | 1/2003 | Stefanescu et al. | |
| 2003/0037048 A1 | 2/2003 | Kabra et al. | |
| 2003/0065595 A1 | 4/2003 | Anglum | |
| 2003/0093260 A1 | 5/2003 | Dagtas et al. | |
| 2003/0126156 A1 | 7/2003 | Stoltenberg et al. | |
| 2003/0153299 A1 | 8/2003 | Perfit et al. | |
| 2003/0154285 A1 | 8/2003 | Bergland et al. | |
| 2003/0167253 A1 | 9/2003 | Meinig | |
| 2004/0019593 A1 | 1/2004 | Borthwick et al. | |
| 2004/0064447 A1 | 4/2004 | Simske et al. | |
| 2004/0068339 A1 | 4/2004 | Cheetham et al. | |
| 2004/0088322 A1 | 5/2004 | Elder et al. | |
| 2004/0098359 A1 | 5/2004 | Bayliss et al. | |
| 2004/0098371 A1 | 5/2004 | Bayliss et al. | |
| 2004/0098372 A1 | 5/2004 | Bayliss et al. | |
| 2004/0098373 A1 | 5/2004 | Bayliss et al. | |
| 2004/0098374 A1 | 5/2004 | Bayliss et al. | |
| 2004/0098390 A1 | 5/2004 | Bayliss et al. | |
| 2004/0172393 A1 | 9/2004 | Kazi et al. | |
| 2005/0071743 A1 | 3/2005 | Harrington et al. | |
| 2005/0154664 A1 | 7/2005 | Guy et al. | |
| 2006/0020611 A1 | 1/2006 | Gilbert et al. | |
| 2006/0080283 A1 | 4/2006 | Shipman et al. | |
| 2006/0116995 A1 | 6/2006 | Bloedorn | |
| 2006/0184460 A1 | 8/2006 | Cleary | |
| 2006/0213976 A1 | 9/2006 | Inaskoshi et al. | |
| 2007/0208694 A1 | 9/2007 | Bayliss et al. | |
| 2007/0271292 A1 | 11/2007 | Acharya et al. | |
| 2007/0299697 A1 | 12/2007 | Friedlander et al. | |
| 2008/0005106 A1 | 1/2008 | Schumacher et al. | |
| 2008/0010296 A1 | 1/2008 | Bayliss et al. | |
| 2008/0077570 A1 * | 3/2008 | Tang et al. | 707/5 |
| 2008/0133502 A1 | 6/2008 | Gurevich et al. | |
| 2008/0208780 A1 | 8/2008 | Hoopes et al. | |
| 2008/0226130 A1 | 9/2008 | Kansai et al. | |
| 2008/0243885 A1 | 10/2008 | Harger et al. | |
| 2008/0244008 A1 | 10/2008 | Wilkinson et al. | |
| 2009/0012971 A1 | 1/2009 | Hunt et al. | |
| 2009/0018996 A1 | 1/2009 | Hunt et al. | |
| 2009/0106245 A1 | 4/2009 | Salcedo | |
| 2009/0271359 A1 | 10/2009 | Bayliss | |
| 2009/0271363 A1 | 10/2009 | Bayliss | |
| 2009/0271397 A1 | 10/2009 | Bayliss | |
| 2009/0271404 A1 | 10/2009 | Bayliss | |
| 2009/0271405 A1 | 10/2009 | Bayliss | |
| 2009/0271424 A1 | 10/2009 | Bayliss | |
| 2009/0271694 A1 | 10/2009 | Bayliss | |
| 2009/0287689 A1 | 11/2009 | Bayliss | |
| 2009/0292694 A1 | 11/2009 | Bayliss | |
| 2009/0292695 A1 | 11/2009 | Bayliss | |

OTHER PUBLICATIONS

International Search Report for International Application No. PCT/US09/49522, mailed Oct. 22, 2009.

Written Opinion for International Application No. PCT/US09/49522, mailed Oct. 22, 2009.

Price et al., "Face Recognition Using Direct, Weighted Linear Discriminant Analysis and Modular Subspaces" [online]; Oak Ridge National Laboratory, 2005 [retrieved on Oct. 13, 2009].

Eike Schallehn et al., "Advanced Grouping and Aggregation for Data Integration," Department of Computer Science, Paper ID: 222, pp. 1-16.

Vincent Coppola, "Killer APP," Men's Journal, vol. 12, No. 3, Apr. 2003, pp. 86-90.

Eike Schallehn et al., "Extensible and Similarity-based Grouping for Data Integration," Department of Computer Science, pp. 1-17.

Rohit Ananthakrishna et al., "Eliminating Fuzzy Duplicates in Data Warehouses," 12 pages.

Peter Christen et al., "Parallel Computing Techniques for High-Performance Probabilistic Record Linkage," Data Mining Group, Australian National University, Epidemiology and Surveillance Branch, Project web page: http://datamining.anu.edu.au/linkage.html, 2002, pp. 1-11.

Peter Christen et al., "Parallel Techniques for High-Performance Record Linkage (Data Matching)," Data Mining Group, Australian National University, Epidemiology and Surveillance Branch, Project web page: http://datamining.anu.edu.au/linkage.html, 2002, pp. 1-27.

Peter Christen et al., "High-Performance Computing Techniques for Record Linkage," Data Mining Group, Australian National University, Epidemiology and Surveillance Branch, Project web page: http://datamining.anu.edu.au/linkage.html, 2002, pp. 1-14.

William E. Winkler., "Matching and Record Linkage," U.S. Bureau of the Census, pp. 1-38.

Peter Christen et al., "High-Performance Computing Techniques for Record Linkage," ANU Data Mining Group, Australian National University, Epidemiology and Surveillance Branch, Project web page: http://datamining.anu.edu.au/linkage.html, pp. 1-11.

William E. Winkler, "The State of Record Linkage and Current Research Problems," U.S. Bureau of the Census, 15 pages.

William E. Winkler, "Advanced Methods for Record Linkage," Bureau of the Census, pp. 1-21.

William E. Winkler, Frequency-Based Matching in Fellegi-Sunter Model of Record Linkage, Bureau of the Census Statistical Research Division, Oct. 4, 2000, 14 pages.

William E. Winkler, "State of Statistical Data Editing and Current Research Problems," Bureau of the Census Statistical Research Division, 10 pages.

The First Open ETL/EAI Software for the Real-Time Enterprise, Sunopsis, A New Generation ETL Tool, "Sunopsis™ v3 expedites integration between heterogeneous systems for Data Warehouse, Data Mining, Business Intelligence, and OLAP projects," <www.suopsis.com>, 6 pages.

Alan Dumas, "The ETL Market and Sunopsis™ v3 Business Intelligence, Data Warehouse & Datamart Projects," 2002, Sunopsis, pp. 1-7.

Teradata Warehouse Solutions, "Teradata Database Technical Overview," 2002, pp. 1-7.

WhiteCross White Paper, May 25, 2000, "wx/des-Technical Information," pp. 1-36.

Teradata Alliance Solutions, "Teradata and Ab Initio," pp. 1-2.

Peter Christen et al., The Australian National University, "Febrl—Freely extensible biomedical record linkage," Oct. 2002, pp. 1-67.

William E. Winkler, "Using the EM Algorithim for Weight Computation in the Fellegi-Sunter Model of Record Linkage," Bureau of the Census Statistical Research Division, Oct. 4, 2000, 12 pages.

William E. Winkler et al., "An Application of the Fellegi-Sunter Model of Record Linkage to the 1990 U.S. Decennial Census," U.S. Bureau of the Census, pp. 1-22.

William E. Winkler, "Improved Decision Rules in the Fellegi-Sunter Model of Record Linkage," Bureau of the Census, pp. 1-13.

Fritz Scheuren et al., "Recursive Merging and Analysis of Administrative Lists and Data," U.S. Bureau of the Census, 9 pages.

William E. Winkler, "Record Linkage Software and Methods for Merging Administrative Lists," U.S. Bureau of the Census, Jul. 7, 2001, 11 pages.

Enterprises, Publishing and Broadcasting Limited, Acxiom-Abilitec, pp. 44-45.

TransUnion, Credit Reporting System, Oct. 9, 2002, 4 pages, <http://www.transunion.com/content/page.jsp?id=/transunion/general/data/business/BusCre...>.

TransUnion, ID Verification & Fraud Detection, Account Acquisition, Account Management, Collection & Location Services, Employment Screening, Risk Management, Automotive, Banking-Savings & Loan, Credit Card Providers, Credit Unions, Energy & Utilities, Healthcare, Insurance, Investment, Real Estate, Telecommunications, Oct. 9, 2002, 46 pages, <http://www.transunion.com>.

White Paper an Introduction to OLAP Multidimensional Terminology and Technotogy, 20 pages.

\* cited by examiner

SYSTEM AND METHOD FOR IDENTIFYING ENTITY REPRESENTATIONS BASED ON A SEARCH QUERY USING FIELD MATCH TEMPLATES

CROSS REFERENCE TO RELATED APPLICATIONS

The present application claims priority to U.S. Provisional Patent Application No. 61/077,676 to Bayliss entitled "Database Systems And Methods," filed Jul. 2, 2008, the contents of which are hereby incorporated by reference.

The following patents and patent applications are related to the present disclosure and are hereby incorporated by reference in their entireties:
U.S. Pat. No. 7,293,024 entitled "Method for sorting and distributing data among a plurality of nodes" to Bayliss et al.;
U.S. Pat. No. 7,240,059 entitled "System and method for configuring a parallel-processing database system" to Bayliss et al.;
U.S. Pat. No. 7,185,003 entitled "Query scheduling in a parallel-processing database system" to Bayliss et al.;
U.S. Pat. No. 6,968,335 entitled "Method and system for parallel processing of database queries" to Bayliss et al.;
U.S. patent application Ser. No. 10/357,447 entitled "Method and system for processing data records" to Bayliss et al.;
U.S. patent application Ser. No. 10/357,481 entitled "Method and system for linking and delinking data records" to Bayliss et al.;
U.S. patent application Ser. No. 10/293,482 entitled "Global-results processing matrix for processing queries" to Bayliss et al.;
U.S. patent application Ser. No. 10/293,475 entitled "Failure recovery in a parallel-processing database system" to Bayliss et al.;
U.S. patent application Ser. No. 10/357,418 entitled "Method and system for processing and linking data records" to Bayliss et al.;
U.S. patent application Ser. No. 10/357,405 entitled "Method and system for processing and linking data records" to Bayliss et al.;
U.S. patent application Ser. No. 10/357,489 entitled "Method and system for associating entities and data records" to Bayliss et al.;
U.S. patent application Ser. No. 10/357,484 entitled "Method and system for processing data records" to Bayliss et al.;
U.S. patent application Ser. No. 11/671,090 entitled "Query scheduling in a parallel-processing database system" to Bayliss et al.;
U.S. patent application Ser. No. 11/772,634 entitled "System and method for configuring a parallel-processing database system" to Bayliss et al.; and
U.S. patent application Ser. No. 11/812,323 entitled "Multi-entity ontology weighting systems and methods" to Bayliss.

The above applications are referred to herein as the "First Generation Patents And Applications." This disclosure may refer to various particular features (e.g., figures, tables, terms, etc.) in the First Generation Patents And Applications. In the case of any ambiguity of what is being referred to, the features as described in U.S. patent application Ser. No. 11/772,634 entitled "System and method for configuring a parallel-processing database system" to Bayliss et al. shall govern.

Also incorporated by reference in their entireties are U.S. Provisional Patent Application No. 61/047,570 entitled "Database systems and methods" to Bayliss and U.S. Provisional Patent Application No. 61/053,202 entitled "Database systems and methods" to Bayliss. These applications are referred to herein as the "Second Generation Patents And Applications."

Also incorporated by reference in their entireties are U.S. patent application Ser. No. 10/866,456 entitled "System and method for returning results of a query from one or more slave nodes to one or more master nodes of a database system" to Chapman et al., U.S. patent application Ser. No. 10/866,204 entitled "System and method for processing query requests in a database system" to Chapman et al., U.S. patent application Ser. No. 10/866,565 entitled "System and method for processing a request to perform an activity associated with a precompiled query" to Chapman et al., and U.S. patent application Ser. No. 10/866,394 entitled "System and method for managing throughput in the processing of query requests in a database system" to Chapman et al. These applications are referred to herein as the "'866 applications." This disclosure may refer to various particular features (e.g., figures, tables, terms, etc.) in the '866 applications. In the case of any ambiguity of what is being referred to, the features as described in U.S. patent application Ser. No. 10/866,204 entitled "System and method for processing query requests in a database system" to Chapman et al. shall govern.

FIELD OF THE INVENTION

The invention relates to database systems and methods. More particularly, the invention relates to a technique for identifying a universal entity representation in an electronic universal database that corresponds to a foreign entity representation in an electronic foreign database, each entity representation comprising a plurality of linked records, each record comprising a plurality of fields, each field capable of containing a field value, each field value associated with a field value weight.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION

Figure 1:
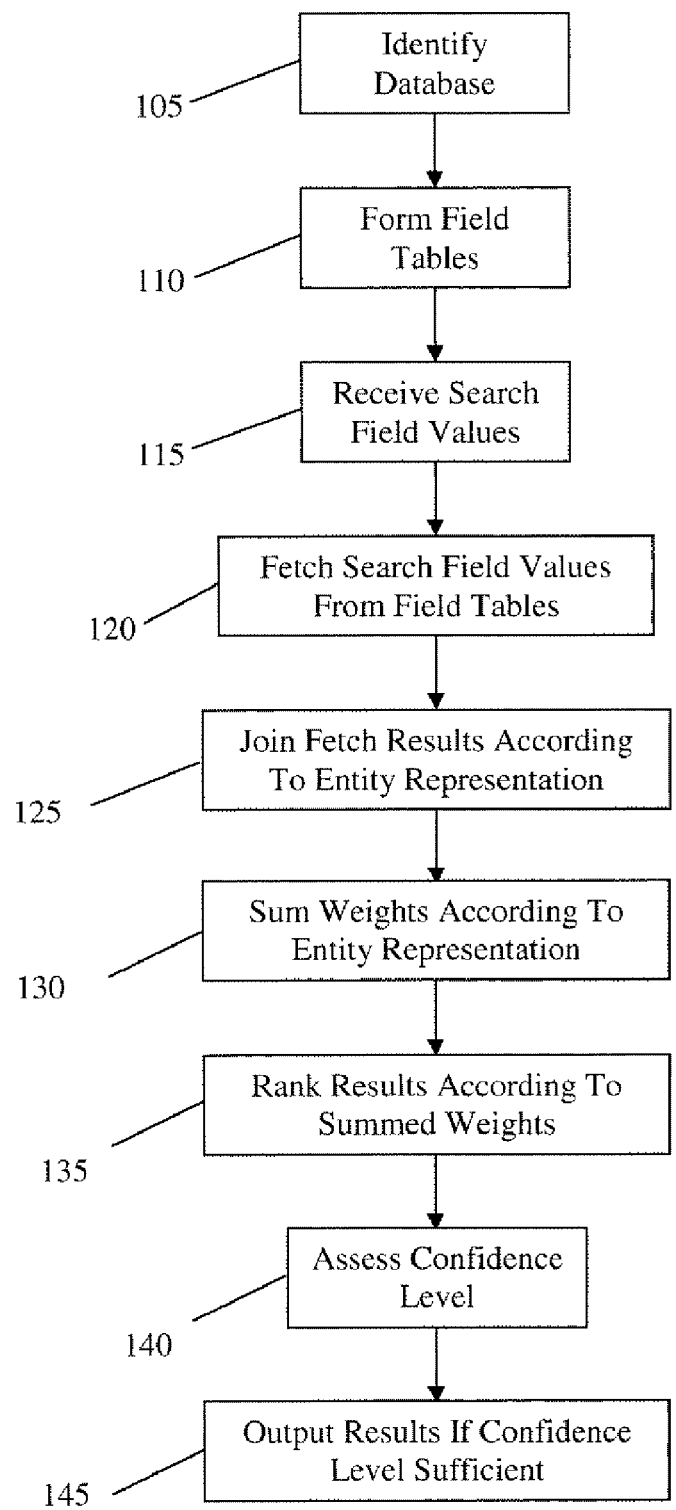
FIG. 1 is a flowchart depicting an embodiment of an invention of Section I.

The following detailed description presents several inventive concepts, which are inter-related. The following Table of Contents summarizes the present disclosure.

| Table of Contents | Section |
| --- | --- |
| Statistical Measure And Calibration Of Search Criteria Where One Or Both Of The Search Criteria And Database Is Incomplete | I |
| Entity Representation Identification Based On A Search Query Using Field Match Templates | II |
| Batch Entity Representation Identification Using Field Match Templates | III |
| Method Of Partitioning Match Templates | IV |
| Statistical Measure And Calibration Of Internally Inconsistent Search Criteria Where One Or Both Of The Search Criteria And Database Is Incomplete | V |
| Statistical Measure And Calibration Of Reflexive, Symmetric And Transitive Fuzzy Search Criteria Where One Or Both Of The Search Criteria And Database Is Incomplete | VI |
| Entity Representation Identification Using Entity Representation Level Information | VII |
| Technique For Recycling Match Weight Calculations | VIII |
| Conclusion | IX |

Certain terms used herein are discussed presently. The term "entity representation" encompasses at least one record, and, more typically, a collection of linked records that refer to the same individual. This term is meant to embrace the computer implemented entities of the First Generation Patents And Applications. The term "field" encompasses any portion of a record into which a field value may be entered. The term "field value" encompasses means and manners used to represent information, not limited to numerical values. A "field value" may include other types of data values comprising one or more character types or combination of character types. This term is meant to embrace the "data field values" of the First Generation Patents And Applications. The term "individual" encompasses a natural person, a company, a body of work, and any institution. The term "probability" encompasses any quantitative measure of likelihood or possibility, not limited to numerical quantities between zero and one. The term "record" encompasses any data structure having at least one field. This term is meant to embrace the "entity references" of the First Generation Patents And Applications. The discussion in this paragraph is meant to provide instances of what is embraced by certain terms by way of non-limiting example and should not be construed as restricting the meaning of such terms.

The present document includes disclosures of several inventions, which are presented in the following Sections I-IX. Embodiments of these inventions may interact and work together with each other and with the systems and methods presented in the First Generation Patents And Applications, the Second Generation Patents And Applications and the '866 applications. For example, parameters generated by an embodiment of an invention presented in one section may be used by an embodiment presented in another section, in the First Generation Patents And Applications, in the Second Generation Patents And Applications, or in the '866 applications. Exemplary details of such interaction are presented herein.

I. STATISTICAL MEASURE AND CALIBRATION OF SEARCH CRITERIA WHERE ONE OR BOTH OF THE SEARCH CRITERIA AND DATABASE IS INCOMPLETE

Techniques according to this section may be used to identify an individual in response to a query (e.g., by identifying a record or entity representation associated with such individual). Some embodiments may be implemented with respect to a database that contains a plurality of records, entity representations, or a combination thereof. Embodiments of the techniques of this section may receive a query that specifies or constrains the field values for one or more fields. Such embodiments may proceed to identify the record or entity representation that most likely corresponds to individual identified by the query.

The contents of certain databases may be restricted by legal or other constraints. Examples of such databases include databases of medical records, financial information, educational information, or other restricted data. The contents of the such databases may be protected by laws including, but not limited to: the Health Insurance Portability and Accountability Act ("HIPAA"), the Gramm-Leach-Bliley Act ("GPA"), or the Family Educational Rights and Privacy Act ("FERPA"). Such databases may thus exclude unfettered access by a practitioner of a technique according to this section. Databases that are owned, operated, accessible to or used by a third party are referred to herein as "foreign." Examples of foreign databases include, but are not limited to, databases in which access is restricted.

A practitioner of the techniques of this section may own, operate or have access to a comprehensive database. Such a database may be intended to be complete, relative to a foreign database, in the sense that it may be intended to include an entity representation corresponding to all or substantially all individuals for which an entity representation exists in the foreign database. Such a database may be referred to herein as "universal." Note, however, that a universal database may not actually be complete in the sense that it may omit records or entity representations that correspond to individuals that are represented in one or more foreign databases. A universal database may have undergone an iterative linking process and associated processes as disclosed in one or both of the First Generation Patents And Applications and the Second Generation Patents And Applications in order to generate accurate entity representations from raw data. In particular, a universal database may include definitive identifiers ("DID") as discussed in the First Generation Patents And Patent Applications. Other techniques for linking records and forming entity representations may be employed in the alternative; however, the present discussion will be with respect to DIDs.

In some embodiments, practitioners of the techniques disclosed herein may operate on foreign database data without violating restrictions on such data. This may be accomplished, by way of nonlimiting, example, as follows. The practitioner may set up a hardened computing facility, which may be made physically inaccessible to unauthorized persons by way of one or more of: physical locks, biometric identification requirements, human guards and electronic intrusion detection. Moreover, the computing facility may include computers that are not linked to any computer outside the facility and not on any network that extends beyond the secure computing facility itself. The facility may enforce a rule that only a customer that supplies data to the faculty may acquire data from the facility. Thus, a customer owning or having rightful access to a foreign database may supply data from the foreign database to the computing facility. While the practitioner may operate on the data in the facility, the practitioner may be prevented from removing any data from the facility. Once operations on the data are complete, the customer may retrieve data from the facility. Upon the customer retrieving such data, the computers in the facility may be secured by flushing volatile memory and securely deleting data from the persistent memory (e.g., by writing random data to the persistent memory multiple times). Thus, a practitioner of the present technique may operate on a foreign database without violating laws or regulations that govern access to such data.

Embodiments according to this section may be used to identify entity representations in a foreign database. This may be accomplished in several ways. For example, a query that is intended to identify a particular individual may be issued to a universal database. The techniques of this section may be utilized to identify an entity representation in the universal database that matches the query. Once the individual is identified using the universal database, more complete information about the individual (as compared to the information specified by the query) may be retrieved from the universal database and supplied to an operator of the foreign database. The operator may then identify records or entity representations in the foreign database that correspond to the more complete information acquired from the universal database. In particular, the information retrieved from the universal database in response to a query may include one or more keys that index one or more records in the foreign database.

In general, the foreign database may be amended to include entity representation identifiers (by way of non-limiting example, DIDs) of the universal database. This technique allows for immediate retrieval of one or more records from the foreign database based on one or more DIDs identified by a query to the universal database. This process may proceed by first establishing a secure computing facility for data from the foreign database as discussed above. The facility may then be provisioned with a copy of the foreign database (or equivalent data). Now, each record in the foreign database corresponds to some individual. Furthermore, each such individual will likely have an associated entity representation in the universal database. As a result of applying the techniques of this section (or those of Sections II or III), each record in the foreign database in the secure facility may have appended to it a DID for the associated entity representation in the universal database. This may be accomplished, for example, using queries, or in one or more batch processes. For a query approach, each record from the copied foreign database may be used to form a query by specifying the field values present in such record. Each query may be submitted to the universal database, which may or may not be external to the facility. The universal database may process each query using a technique of this section in order to identify a corresponding entity representation. The DID of that entity representation may then be transferred back into the secure facility (if it is not already there, e.g., if the secure facility contains a copy of the universal database) and appended to the record that generated the query. This process may be repeated for each record in the copied foreign database until each record therein has a DID for the corresponding entity representation in the universal database appended thereto. Note further that this process may be done in batch form, on a parallel computer, or a combination of both.

Among other benefits of this approach is that the operator of the foreign database may discover multiple records for the same individual. For example, a bank may have multiple accounts held by the same individual, or a retailer may have multiple accounts for the same individual. By associating each record in the foreign database with a DID, the operator of the foreign database can determine that two different records have the same DID and are therefore associated with the same individual. A bank armed with such knowledge may be better able to serve the customer once it realizes that the customer holds multiple accounts, and the retailer may omit duplicative mailings, for example.

A batch processing approach may proceed as follows. One or more groups of records in the foreign database may be processed together in a batch. Each group may be a small as a single record, as big as the entire foreign database, or any size in between. Each record group may be processed according to one or more of the techniques disclosed herein. More particularly, each record group may be applied against the universal database in order to identify a DID for each record therein. Such DIDs are, as in the query approach, associated with the entity representations in the universal database. Once each record in a group is associated with a DID, the foreign database may be amended to include such DIDs in association with the records. This process may proceed to process records from the foreign database until each such record has an appended DID or a determination is made for such record that a DID from the universal database is unavailable. Note that the batch processing approach is suited for foreign databases that do not have access restrictions, such that batches of records may be transferred to the secure computing facility or another facility. For foreign databases that have access restrictions, the computing facility may be modified by including a copy of the universal database. In such an arrangement, the secure computing facility may accomplish the batch processing without any record from the foreign database leaving the secure computing facility (until the customer retrieves the processed data).

Whether a query-based approach is used or a batch processing approach is used, a result may be that each record (or substantially all records) in the foreign database has an appended DID that corresponds to an entity representation in the universal database. Thus, queries about individuals reflected in the foreign database may be processed by submitting such query to the universal database, determining an entity representation in the universal database identified by the query, retrieving the associated DID, and then locating a record in the foreign database by using that DID. Thus, queries regarding the foreign database may be processed without needing to access the foreign database until the moment when the record or entity representation is retrieved.

FIG. 1 is a flowchart depicting an embodiment of an invention of Section I. An exemplary embodiment of a technique for processing a query to a universal database (or other database) in order to identify one or more records is discussed presently. The technique may generally include receiving a query and then outputting a DID (or other entity representation identifier) for one or more records that correspond to the query. As discussed in detail above, one application of the present technique is in submitting a query to a universal database in order to identify an entity representation in a foreign database by way of the DID produced by the present technique. However, embodiments of the present technique are not limited to such instances and may be used to process queries generally. That is, the present technique may be applied to a universal database for the purpose of identifying a record in a foreign database, or may be applied to any general purpose database in order to identify a record therein. Thus, discussion of the present technique will be made in reference to a "database," identified at block 105, which may be universal or otherwise. The exemplary database under discussion may have undergone an iterative linking process and other processes as disclosed in the First Generation Patents And Applications or the Second Generation Patents And Applications such that the database contains a plurality of entity references, each (or substantially each) of which consists of a plurality of records linked according to shared DIDs. Alternately, the exemplary database under discussion may consist of unlinked records; in such instance, record identifications may be used as DIDs.

For purposes of discussion, a portion of a database with records containing a first name field ("FN"), a last name field ("LN"), a state field ("ST"), a zip code field ("ZIP"), a social security number field ("SSN") and a definitive identifier field ("DID") is presented below.

TABLE I.1

| DID | FN | LN | ST | ZIP | SSN |
|---|---|---|---|---|---|
| 1 | John | Smith | Florida | | 999-99-9999 |
| 1 | John | Smith | | 33446 | |
| 2 | Jane | Smith | Virginia | | 888-88-8888 |
| 2 | J. | Smith | | | 888-88-8888 |
| 3 | Jane | Doe | Florida | | 777-77-7777 |
| 4 | Bill | Doe | Michigan | | |
| 5 | John | Doe | Nevada | 89146 | |

The exemplary embodiment may proceed as follows. At block 110, a table may be generated for some or all (non-DID) fields in any record in the database; such tables are referred to as "field tables." Each field table may include a column for a field value, a column for weights associated with the field values, and a column for an associated definitive identifier. The weights may be, by way of non-limiting example, field weights or field value weights as disclosed in the Second Generation Patents And Applications. The field tables may have repeat entries removed. In some embodiments, the field tables omit the field value column. Exemplary tables that correspond to Table I.1 above appear below.

TABLE I.2

FN Field Table

| Field Value | Weight | DID |
|---|---|---|
| John | 4 | 1 |
| Jane | 5 | 2 |
| J. | 2 | 2 |
| Bill | 6 | 4 |
| John | 4 | 5 |

TABLE I.3

LN Field Table

| Field Value | Weight | DID |
|---|---|---|
| Smith | 7 | 1 |
| Smith | 7 | 2 |
| Doe | 6 | 3 |
| Doe | 6 | 4 |
| Doe | 6 | 5 |

TABLE I.4

ST Field Table

| Field Value | Weight | DID |
|---|---|---|
| Florida | 8 | 1 |
| Virginia | 7 | 2 |
| Michigan | 6 | 4 |
| Nevada | 11 | 5 |

TABLE I.5

ZIP Field Table

| Field Value | Weight | DID |
|---|---|---|
| 33446 | 22 | 1 |
| 89146 | 25 | 5 |

TABLE I.6

SSN Field Table

| Field Value | Weight | DID |
|---|---|---|
| 999-99-9999 | 22 | 1 |
| 888-88-8888 | 22 | 2 |
| 777-77-7777 | 22 | 3 |

At block 115, the exemplary embodiment proceeds by receiving a query that specifies or constrains at least one field value. The received search field value data may be in the form of by way of nonlimiting examples, a query or a set of specific field values. Continuing the specific example under discussion, an exemplary query may be of the form: {FN=John & LN=Smith & ZIP=33446 & ST=Florida}. Exemplary and suitable query forming and processing techniques and hardware are disclosed in the First Generation Patents And Applications. At block 120, the embodiment proceeds to perform a fetch operation for each specified search criterion. In this instance, there are four fetches: one performed on the FN field table for FN=John, one performed on the LN field table for LN=Smith, one performed on the zip code field table for ZIP=33446, and one performed on the state field table for ST=Florida. The first fetch returns the first and fifth rows of the FN field table; the second fetch returns the first and second rows of the LN field table, the third fetch returns the first row of the ZIP field table, and the fourth fetch returns the first row of the ST field table. At block 125, these results are then joined according to DID, and at block 130 the weights summed for each DID. A table resulting from the example under discussion is produced below.

TABLE I.7

| DID | FN | FN Weight | LN | LN Weight | ST | ST Weight | ZIP | ZIP Weight | Summed Weights |
|---|---|---|---|---|---|---|---|---|---|
| 1 | John | 4 | Smith | 7 | Florida | 8 | 33446 | 22 | 41 |
| 2 | | | Smith | 7 | | | | | 7 |
| 5 | John | 4 | | | | | | | 4 |

Note that in some embodiments, the table may omit the field values. Next, at block 135, the results are sorted by summed weights. In the present example, the results that appear in Table I.7 are already sorted by summed weights, so no manipulation is required in this example. Due to the way that the table was created, the first record is the most likely record to correspond to the query.

Next, at block 140, a confidence level is assessed regarding whether the first record in the table is indeed a record specified by the query. That is, a determination is made as to whether it is sufficiently probable that the first record is responsive to the query. There are several techniques that may be used to make such an assessment.

A first technique for gauging whether the first record is correct follows. The score for the first record is compared to the score of the second record. If the difference between the first record's score and the second record's score is at least $-\log(1-C)$, where C is a confidence level expressed as a probability, then the probability that the first record is indeed correct is at least C. This relation may be expressed as, by way of non-limiting example:

$$w_1 - w_2 \geq -\log(1-C). \quad \text{Equation 1}$$

(Formally, the expression above is a relation; however, for convenience it will be referred to as "Equation 1.") In Equation 1, $w_1$ represents the score for the first record, $w_2$ represents the score for the second record, and C represents a selected confidence level. In Equation 1, and throughout this disclosure, by way of non-limiting example, the log function has as its base two (2). Nevertheless, other bases may be used in embodiments of the present inventions, such as, by way of non-limiting example, 2, 3⅓ or 10. If the relation expressed in Equation 1 holds, then the first record is correct with a confidence level of C.

Applying Equation 1 to the example under discussion, the score of the first record is 41, and the score of the second record is 7. Thus, the difference between the scores for the first and second records is $w_1 - w_2 = 41 - 7 = 34$. Suppose that circumstances require that the confidence level be at least 99%. Then, by applying Equation 1, a determination is made as to whether 34 is at least as great as $-\log(1-0.99)$. Because $-\log(1-0.99)=6.64$, which is less than 34, the confidence level is met.

A second technique for gauging whether the first record is correct follows. For the second technique, the scores for all of the records in the results table (e.g., Table I.7) are used. For the second technique, the confidence level may be calculated as one minus the sum of the reciprocals of two raised to the power of the differences between the weight for the first record and the weights for the other records. Formally, this may be expressed as, by way of non-limiting example:

$$C = 1 - \sum_i \frac{1}{2^{w_1 - w_i}}. \quad \text{Equation 2}$$

In Equation 2, C represents the confidence level that the first record is correct, the term $w_1$ represents the score for the first record, and each $w_i$ represents the weight of the i-th record. The sum in Equation 2 is over all weights in the results table. Applying Equation 2 to the example under discussion yields, by way of non-limiting example:

$$\begin{aligned} C &= 1 - \frac{1}{2^{w_1 - w_2}} + \frac{1}{2^{w_1 - w_3}} \\ &= 1 - \frac{1}{2^{41-7}} + \frac{1}{2^{41-4}} \\ &= 0.9999. \end{aligned} \quad \text{Equation 3}$$

Thus, according to Equation 3, the confidence level that the first record is the correct record (i.e., that it correctly matches the query) is at least 99.99%. If the confidence level computed according to Equation 2 meets or exceeds a specified confidence level, then the first record may be considered correct. Note that this second technique may be implemented by first specifying C and then determining whether the first record meets the selected confidence level.

A third technique for gauging whether the first record is correct is similar to the second technique. For the third technique, instead of computing the entire sum of Equation 2, the sum is computed only for the first few scores after the first score. In non-limiting exemplary embodiments, the sum may be computed over the second score alone, over the second and third scores, over the second through fifth scores, or over the second through tenth scores. Other sums are possible. Other than the number of scores taken into account, the third technique may proceed according to the second technique.

The first three techniques for gauging whether the first record in the results table is correct are particularly suitable when the universal database contains records for every individual reflected in the foreign database. However, that situation may not always be the case. Accordingly, a fourth technique is provided, where the fourth technique that provides accurate results even when the universal database is not complete. That is, the fourth technique is particularly suited for situations where the query is meant to identify an individual represented in a foreign database, where the query is made to a universal database (this situation is discussed in detail above in this section), but where the universal database is not complete relative to the foreign database. The fourth technique thus provides accurate results even when the foreign database contains records for individuals that are not represented by any records in the universal database. Note however, that any technique discussed herein may be applied in any situation, not limited to those described herein as being particularly suited to it.

A detailed description of the fourth technique for gauging whether the first record is correct follows. The fourth technique accounts for a difference between the universal database and the foreign database in the following way. If the universal database reflects U individuals, where U is a number, and the foreign database reflects F individuals, where F is a number, then there are F−U individuals accounted for in the foreign database but unaccounted for in the universal database. This unaccounted for population may be essentially treated as a monolithic unknown set of individuals. Thus, the fourth technique allows for a conclusion that the first record is correct with a confidence level of C, where C is a probability, when the following equation obtains:

$$w_1 \geq \log(F-U) - \log(1-C). \quad \text{Equation 4}$$

In Equation 4, $w_1$ represents the score of the first record and C, U and F are as described above. Note that in some embodiments, the quantity F−U is approximated. This may be accomplished in several ways. By way of non-limiting example, if a foreign database holds records for people that are between 16 and 25 years old (inclusive), and the universal database holds records for people that are between 18 and 25 years old (inclusive), then F−U may be approximated as 20% multiplied by the number of entity representations in the foreign database. (This is because the foreign database holds records for people of ten different aces, yet the universal database holds records of eight different ages, a difference of two years, or $2/10=20\%$.) In some embodiments, in addition to Equation 4 being satisfied, Equation 1 is also checked to determine whether it is satisfied. In other embodiments, the technique of Equation 4 may be combined with any of the first three techniques. That is, in such embodiments, the first record satisfies Equation 4 and passes the tests set forth according to any of the first three techniques. In some such embodiments, the same confidence level may be a parameter in the equations of two or more techniques.

Note that the techniques described in reference to Equations 1-4 are not limited to application to tables formed according to the techniques discussed in reference to I.1-I.7 above. For example, the techniques described in reference to Equations 1-4 may be used to determine whether results produced according to any of the techniques presented herein (e.g., in Sections II or III) are sufficiently reliable.

If the assessed confidence level passes the selected test according to any of Equations 1-4 above, at block 145 the technique outputs information reflecting the identified entity representation. In some embodiments, a DID of the highest ranked entity reference is output; in other embodiments, other information, such as a social security number, may be output. Note that the output may be via a monitor in a human-readable form, to another computer in computer-readable form, or in any other form that sufficiently identifies the result.

According to an exemplary embodiment, a method for identifying an entity representation associated with a universal database that corresponds to search criteria associated with a foreign database is disclosed. The method includes, for each search criterion of the search criteria, separately fetching a set of data, each set of data including portions of at least one record from the universal database, each portion including a weight and an individual identifier. The method also includes merging the sets of data according to individual identifiers, resulting in merged sets of data. The method further includes determining a merged set of data with a greatest cumulative weight. The method further includes calculating a confidence level that a record from the universal database corresponding to the merged set of data with the greatest cumulative weight matches the search criteria.

II. ENTITY REPRESENTATION IDENTIFICATION BASED ON A SEARCH QUERY USING FIELD MATCH TEMPLATES

Techniques according to this section may be used to identify an individual in response to a query (e.g., by identifying a record or entity representation associated with such individual). Embodiments of the techniques of this section may receive a query that specifies or constrains the field values for one or more fields. Such embodiments may proceed to identify the record or entity representation that most likely corresponds to the individual identified by the query.

In general, the techniques described in this section may provide a practical application of the techniques of processing search criteria to a universal database (or other database) in order to identify one or more records as described in Section I. Such techniques may generally include receiving a query and then outputting a DID (or other entity representation identifier) for one or more records that correspond to the query. For ease of discussion and without limitation, the following will be in reference to DIDs, with the understanding that other identification or linking schemas may be used. Embodiments of the techniques of this section may output a DID that most likely corresponds to a query when data associated with a universal database is incomplete or erroneous, data associated with the query is incomplete or erroneous, or a combination of both. Such embodiments may proceed to identify a DID that most likely corresponds to the query using a finite number of field match templates.

Figure 2:
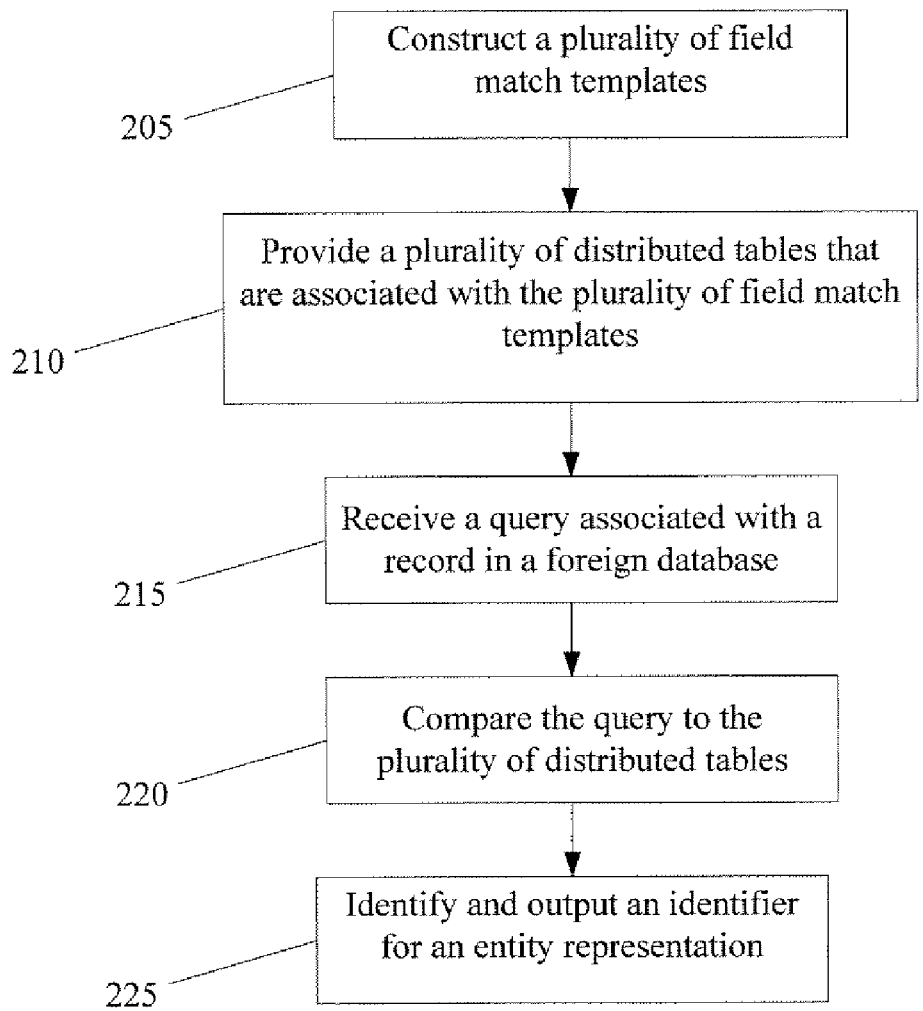
FIG. 2 is a flowchart depicting an embodiment of an invention of Section II.

FIG. 2 is a flowchart depicting an exemplary embodiment according to this section. At block 205, a plurality of field match templates are constructed.

In various embodiments, the techniques of this section and other sections may begin by constructing one or more field match templates that may be used to partition a given search criteria (e.g., a query) according to (1) fields that must be populated and match, referred to as "fixed" fields, (2) fields that must match if populated, referred to as "optional" fields, and (3) fields that need not match, but that are counted toward a match score if populated and a match occurs, referred to as "extra credit" fields.

That is, for a record to be considered to match a search criteria, all fields in the record that a field match template designates as fixed must be populated with field values that match the corresponding search criteria fixed field values. Otherwise the entire record is considered not to match the search criteria.

For a record to be considered to match a search criteria, fields in a record that a field match template designates as optional may be blank (i.e., null) or, if populated with field values, such field values must match the corresponding optional field values of the search criteria. Otherwise the entire record is considered not to match the search criteria.

A record may be considered to match a search criteria even if there is not a match in a field designated extra-credit. For example, fields in a record that a field match template designates as extra-credit may be blank (i.e., null) or populated with field values that do not match the corresponding extra-credit field values of the search criteria, the record would still be considered a match to the search criteria. If the extra-credit fields of the record are populated with field values that match the corresponding extra-credit field values of the search criteria, the field values of the extra-credit fields of the record are counted toward a match score. Otherwise, the field values of the extra-credit fields of the record are not counted toward a match score. In some embodiments, the associated field value weight may be subtracted from a match score.

In some embodiments, a field match template may be constructed based on one or more of the most popular queries as determined by accessing one or more query logs associated with a database.

In various embodiments, a field match template may include one or more fixed fields, zero or more optional fields, a DID field, and zero or more extra credit fields. In such embodiments, the sequence of a field match template may be ordered such that one or more fixed fields are first, followed by one or more optional fields, and one or more extra credit fields are last. The DID field may be placed after one or more fixed fields, after one or more optional fields, or before one or more extra credit fields.

In symbols, a field match template may be represented as, by way of non-limiting example: (FN, LN, ST, DID, CITY). In this example, the symbol "FN" may correspond to a first name field, the symbol "LN" may correspond to a last name field, the symbol "ST" may correspond to a state field, and the symbol "CITY" may correspond to a city field. The symbol "DID" may correspond to a definitive identifier described in the First Generation Patents and Applications. In this example, the first name field and last name field may be fixed fields, the state field may be an optional field, and the city field may be an extra credit field. Another field match template may be represented as, by way of non-limiting example: (FEN, LN, DID, ST, CITY). In this example, the first name field and last name field may be fixed fields, while the state field and city field may be extra credit fields. Yet another field match template may be represented as, by way of non-limiting example: (FN, LN, ST, CITY, DID). In this example, the first name field and last name field may be fixed fields, while the state field and city field may be optional fields. Match templates may include internal indicia that designate where the partitions between fixed, optional and extra credit fields occur. The exact form in which match templates are electronically stored may vary.

In various embodiments, records stored in the database may be stored according to the methods described in the '866 applications. Accordingly, one or more records of the database may be stored in distributed tables sorted by one or more fields associated with a field match template. In some embodiments, the columns (e.g., fields) of the distributed tables may be ordered in a particular sequence. In such embodiments, the particular sequence of the columns of a distributed table may be determined based on the sequence of fields of a field match template associated with the distributed table. For example, a field match template represented as (FN, LN, ST, DID, CITY), where the first name field and the last name field of the field match template are fixed fields, the state field of the field match template is an optional field, and the city field of the field match template is extra credit, may be associated with one or more distributed tables with records stored sorted by a first name field, a last name field, a state field, and a DID field.

It is noted that, in some embodiments, the database may be implemented in a SQL relational database management system environment. In such embodiments, the fixed fields may be the columns of an indexed table.

At block 210, a plurality of distributed tables that are associated with one or more field match templates are provided. In various embodiments, one or more distributed tables associated with a field match template may be stored sorted by the fixed fields, the optional fields, the DID field of the field match template, or a combination thereof. Thus, the one or more distributed tables associated with the field match template described above may be sorted by the first name field, then sorted by the last name field, then sorted by the state field, and then sorted by the DID field. In some embodiments, extra credit fields may not effect the way in which records associated with a distributed table are stored. By way of non-limiting example, a portion of a database associated with a field match template represented as: (FN, LN, ST, DID, CITY) may be sorted and stored as depicted below.

TABLE II.1

| FN | LN | ST | DID | CITY |
|---|---|---|---|---|
| Brian | Adams | Alabama | 21 | Birmingham |
| Brian | Adams | Florida | 82 | Tampa |
| Brian | Adams | New York | 5 | Syracuse |
| Brian | Anderson | California | 48 | San Diego |
| Brian | Anderson | California | 96 | Los Angeles |
| Brian | Anderson | California | 132 | San Diego |

As depicted in Table II.1, the technique may store one or more records of the database in a distributed table sorted by one or more fixed fields, one or more optional fields, and a DID field associated with a field match template. Thus, one or more search results fetched from the distributed table may be returned sorted. Accordingly, the DID field may be strategically placed (e.g., after the one or more fixed fields or one or more optional fields and before one or more extra credit fields) in a field match template to enable one or more search results of given search criteria (e.g., a query) to be returned in a sorted state without the need to separately sort the returned results.

In various embodiments, a distributed database associated with a field match template may be distributed over and stored on one or more nodes as described in the FIGS. 1 and 2 of the '866 applications. Accordingly, this technique may support parallel processing of given search criteria.

For purposes of discussion, a portion of a database with records containing a first name field ("FN"), a middle name field ("MN"), a last name field ("LN"), an age field ("AGE"), a city field ("CITY"), a state field ("ST"), and a definitive identifier field ("DID") is reproduced below.

TABLE II.2

| DID | FN | MN | LN | AGE | CITY | ST |
|---|---|---|---|---|---|---|
| 1 | Jon | Ron | Doe | 39 | Miami | |
| 1 | Jon | | Doe | | | Florida |
| 2 | John | Ronald | Doe | | | Florida |
| 3 | Jack | Ron | Doe | 72 | | |
| 3 | Jack | Ronald | Doe | | Tampa | Florida |
| 3 | Jack | | Doe | 72 | | |
| 4 | John | Ron | Doe | | Tampa | |
| 4 | John | | Doe | 32 | | Florida |
| 4 | John | Ronald | Doe | | Tampa | |
| 5 | Jason | Rick | Doe | 31 | Orlando | |
| 5 | Jason | | Doe | 31 | | Florida |
| 6 | John | | Doe | 32 | | |
| 6 | John | Ronald | Doe | | | Florida |
| 6 | John | | Doe | 32 | Tampa | Florida |
| 6 | John | Ron | Doe | | | Florida |
| 7 | John | Ronald | Doe | 21 | Orlando | Florida |
| 7 | John | | Doe | 21 | | Florida |

According to this exemplary embodiment, three field match templates may be defined as follows: Field Match Template A: (FN, MN, LN, DID) where all the non-DID fields of Field Match Template A are fixed fields, Field Match Template B: (FN, LN, MN, AGE, DID) where the first name field and the last name field of Field Match Template B are fixed fields and the middle name field and the age field of Field Match Template B are optional fields, and Field Match Template C: (FN, LN, ST, DID, CITY) where the first name field, last name field, and state field of Field Match Template C are fixed fields and the city field of Field Match Template C is an extra credit field.

As discussed above and according to this exemplary embodiment, the portion of the database reproduced in Table II.2 may be stored in one or more distributed tables associated with Field Match Template A, one or more distributed tables associated with Field Match Template B, and one or more distributed tables associated with Field Match Template C. To illustrate, Table II.3A, a distributed table associated with Field Match Template A, Table II.3B, a distributed table associated with Field Match Template B, and Table II.3C, a distributed table associated with Field Match Template C are produced below, respectively.

TABLE II.3A

| FN | MN | LN | DID |
|---|---|---|---|
| Jack | Ron | Doe | 3 |
| Jack | Ronald | Doe | 3 |
| Jack |  | Doe | 3 |
| Jason | Rick | Doe | 5 |
| Jason |  | Doe | 5 |
| John | Ron | Doe | 4 |
| John | Ron | Doe | 6 |
| John | Ronald | Doe | 2 |
| John | Ronald | Doe | 4 |
| John | Ronald | Doe | 6 |
| John | Ronald | Doe | 7 |
| John |  | Doe | 4 |
| John |  | Doe | 6 |
| John |  | Doe | 6 |
| John |  | Doe | 7 |
| Jon | Ron | Doe | 1 |
| Jon |  | Doe | 1 |

TABLE II.3B

| FN | LN | MN | AGE | DID |
|---|---|---|---|---|
| Jack | Doe | Ron | 72 | 3 |
| Jack | Doe | Ronald |  | 3 |
| Jack | Doe |  | 72 | 3 |
| Jason | Doe | Rick | 31 | 5 |
| Jason | Doe |  | 31 | 5 |
| John | Doe | Ron |  | 4 |
| John | Doe | Ron |  | 6 |
| John | Doe | Ronald | 21 | 7 |
| John | Doe | Ronald |  | 2 |
| John | Doe | Ronald |  | 4 |
| John | Doe | Ronald |  | 6 |
| John | Doe |  | 21 | 7 |
| John | Doe |  | 32 | 4 |
| John | Doe |  | 32 | 6 |
| John | Doe |  | 32 | 6 |
| Jon | Doe | Ron | 39 | 1 |
| Jon | Doe |  |  | 1 |

TABLE II.3C

| FN | LN | ST | DID | CITY |
|---|---|---|---|---|
| Jack | Doe | Florida | 3 | Tampa |
| Jack | Doe |  | 3 |  |
| Jack | Doe |  | 3 |  |
| Jason | Doe | Florida | 5 |  |
| Jason | Doe |  | 5 | Orlando |
| John | Doe | Florida | 2 |  |
| John | Doe | Florida | 4 |  |
| John | Doe | Florida | 6 |  |
| John | Doe | Florida | 6 | Tampa |
| John | Doe | Florida | 6 |  |
| John | Doe | Florida | 7 | Orlando |
| John | Doe | Florida | 7 |  |
| John | Doe |  | 4 | Tampa |
| John | Doe |  | 4 | Tampa |
| John | Doe |  | 6 |  |
| Jon | Doe | Florida | 1 |  |
| Jon | Doe |  | 1 | Miami |

In various embodiments, a field value weight field associated with each non-DID field value in a distributed table may be stored in the distributed table. Accordingly, a field value weight field associated with each non-DID field in Table II.3A, Table II.3B, and Table II.3C may be stored in Table II.3A, Table II.3B, and Table II.3C. To illustrate, Table II.4A with a field value weight field for each non-DID field in Table II.3A, Table II.4B with a field value weight field for each non-DID field in Table II.3B, and Table II.4C with a field value weight field for each non-DID field in Table II.3C are produced below.

TABLE II.4A

| FN | MN | LN | DID | FN_Value Weight | MN_Value Weight | LN_Value Weight |
|---|---|---|---|---|---|---|
| Jack | Ron | Doe | 3 | 8 | 3 | 6 |
| Jack | Ronald | Doe | 3 | 8 | 5 | 6 |
| Jack |  | Doe | 3 | 8 |  | 6 |
| Jason | Rick | Doe | 5 | 5 | 6 | 6 |
| Jason |  | Doe | 5 | 5 |  | 6 |
| John | Ron | Doe | 4 | 4 | 3 | 6 |
| John | Ron | Doe | 6 | 4 | 3 | 6 |
| John | Ronald | Doe | 2 | 4 | 5 | 6 |
| John | Ronald | Doe | 4 | 4 | 5 | 6 |
| John | Ronald | Doe | 6 | 4 | 5 | 6 |
| John | Ronald | Doe | 7 | 4 | 5 | 6 |
| John |  | Doe | 4 | 4 |  | 6 |
| John |  | Doe | 6 | 4 |  | 6 |
| John |  | Doe | 6 | 4 |  | 6 |
| John |  | Doe | 7 | 4 |  | 6 |
| Jon | Ron | Doe | 1 | 8 | 3 | 6 |
| Jon |  | Doe | 1 | 8 |  | 6 |

TABLE II.4B

| FN | LN | MN | AGE | DID | FN_Value Weight | LN_Value Weight | MN_Value Weight | AGE_Value Weight |
|---|---|---|---|---|---|---|---|---|
| Jack | Doe | Ron | 72 | 3 | 8 | 6 | 3 | 15 |
| Jack | Doe | Ronald |  | 3 | 8 | 6 | 5 |  |
| Jack | Doe |  | 72 | 3 | 8 | 6 |  | 15 |
| Jason | Doe | Rick | 31 | 5 | 5 | 6 | 6 | 10 |
| Jason | Doe |  | 31 | 5 | 5 | 6 |  | 10 |
| John | Doe | Ron |  | 4 | 4 | 6 | 3 |  |
| John | Doe | Ron |  | 6 | 4 | 6 | 3 |  |
| John | Doe | Ronald | 21 | 7 | 4 | 6 | 5 | 14 |
| John | Doe | Ronald |  | 2 | 4 | 6 | 5 |  |
| John | Doe | Ronald |  | 4 | 4 | 6 | 5 |  |
| John | Doe | Ronald |  | 6 | 4 | 6 | 5 |  |
| John | Doe |  | 21 | 7 | 4 | 6 |  | 14 |
| John | Doe |  | 32 | 4 | 4 | 6 |  | 10 |
| John | Doe |  | 32 | 6 | 4 | 6 |  | 10 |
| John | Doe |  | 32 | 6 | 4 | 6 |  | 10 |
| Jon | Doe | Ron | 39 | 1 | 8 | 6 | 3 | 12 |
| Jon | Doe |  |  | 1 | 8 | 6 |  |  |

TABLE II.4C

| FN | LN | ST | DID | CITY | FN_Value Weight | LN_Value Weight | ST_Value Weight | CITY_Value Weight |
|---|---|---|---|---|---|---|---|---|
| Jack | Doe | Florida | 3 | Tampa | 8 | 6 | 8 | 9 |
| Jack | Doe |  | 3 |  | 8 | 6 |  |  |
| Jack | Doe |  | 3 |  | 8 | 6 |  |  |
| Jason | Doe | Florida | 5 |  | 5 | 6 | 8 |  |
| Jason | Doe |  | 5 | Orlando | 5 | 6 |  | 4 |
| John | Doe | Florida | 2 |  | 4 | 6 | 8 |  |
| John | Doe | Florida | 4 |  | 4 | 6 | 8 |  |
| John | Doe | Florida | 6 |  | 4 | 6 | 8 |  |
| John | Doe | Florida | 6 | Tampa | 4 | 6 | 8 | 9 |
| John | Doe | Florida | 6 |  | 4 | 6 | 8 |  |
| John | Doe | Florida | 7 | Orlando | 4 | 6 | 8 | 4 |
| John | Doe | Florida | 7 |  | 4 | 6 | 8 |  |
| John | Doe |  | 4 | Tampa | 4 | 6 |  | 9 |
| John | Doe |  | 4 | Tampa | 4 | 6 |  | 9 |
| John | Doe |  | 6 |  | 4 | 6 |  |  |
| Jon | Doe | Florida | 1 |  | 8 | 6 | 8 |  |
| Jon | Doe |  | 1 | Miami | 8 | 6 |  | 3 |

At block 215, a query associated with a record in a foreign database is received. Accordingly, the techniques of this section may proceed by receiving a query that specifies or constrains at least one field value. Continuing the specific example under discussion, an exemplary query may be of the form: {FN=John & MN=Ronald & LN=Doe & AGE=32 & CITY=Tampa & ST=Florida}.

At block 220, the query is compared to the plurality of distributed tables. An embodiment may proceed to perform a fetch operation for each specified search criterion that is associated with a fixed field if a search criterion is provided for all of the fixed fields associated with a defined field match template. Since the given search criteria provides a search criterion for all the fixed fields of each defined field match template, the technique may proceed to perform a fetch operation for each specified search criterion that is associated with a fixed field on one or more distributed tables associated with each defined field match template (e.g., Field Match Template A, Field Match Template B, Field Match Template C). In this instance, there are three fetches: one performed on Table II.4A that is associated with Field Match Template A for FN=John & MN=Ronald & LN=Doe, one performed on Table II.4B that is associated with Field Match Template B for FN-John & LN=Doe, and one performed on Table II.4C that is associated with Field Match Template C for FN=John & LN=Doe & ST=Florida. In various embodiments, one or more fetch operations may be performed in parallel using parallel processing techniques described in FIGS. 1 and 2 of the '866 applications.

The techniques of this section may continue by filtering the search results returned from each of the fetch operations using one or more specified search criterion that are associated with optional fields. Accordingly, the technique may filter the search results returned from the first fetch operation on Table II.4A using one or more specified search criterion that are associated with optional fields of Field Match Template A, the second fetch operation on Table II.4B using one or more specified search criterion that are associated with optional fields of Field Match Template B, and the third fetch operation on Table II.4C using one or more specified search criterion that are associated with optional fields of Field Match Template C.

Given that Field Match Template B includes two optional fields, the technique may filter the search results returned from the second fetch operation on Table II.4B using the specified search criterion associated with the MN field and the AGE field of Field Match Template B.

As previously discussed, the filter operation may return a search result for a given search criterion that is associated with an optional field if the search criterion matches the field value of an optional field of a record in the search results returned from the second fetch operation on Table II.4B or if the field value of the optional field of a record in the search results returned from the second fetch operation on Table II.4B is blank (e.g., null value). Thus, the filter operation may filter the search results returned from the second fetch operation on Table II.4B using MN=Ronald & AGE=32. In various embodiments, the filter may return a search result for a given search criterion that is associated with an optional field of a record in the search results returned from the second fetch operation on Table II.4B if the search criterion is blank. Thus, the first fetch operation returns the eighth row thru the eleventh row of Table II.4A; the second fetch operation and the filter operation returns the ninth row thru the eleventh row of Table II.4B and the thirteenth row thru the fifteenth row of Table II.4B, and the third fetch operation returns the sixth row thru the twelfth row of Table II.4C. To illustrate, the Table II.5A resulting from the first fetch operation, the Table II.5B resulting from the second fetch operation and the filter operation, and the Table II.5C resulting from the third fetch operation are produced below. It should be noted that, in some embodiments, records returned by such fetches and filters may be altered to omit the actual field values. In such embodiments, the DIDs may be included.

TABLE II.5A

| FN | MN | LN | DID | FN_Value Weight | MN_Value Weight | LN_Value Weight |
|---|---|---|---|---|---|---|
| John | Ronald | Doe | 2 | 4 | 5 | 6 |
| John | Ronald | Doe | 4 | 4 | 5 | 6 |
| John | Ronald | Doe | 6 | 4 | 5 | 6 |
| John | Ronald | Doe | 7 | 4 | 5 | 6 |

TABLE II.5B

| FN | LN | MN | AGE | DID | FN_Value Weight | LN_Value Weight | MN_Value Weight | AGE_Value Weight |
|---|---|---|---|---|---|---|---|---|
| John | Doe | Ronald |   | 2 | 4 | 6 | 5 |   |
| John | Doe | Ronald |   | 4 | 4 | 6 | 5 |   |
| John | Doe | Ronald |   | 6 | 4 | 6 | 5 |   |
| John | Doe |   | 32 | 4 | 4 | 6 |   | 10 |
| John | Doe |   | 32 | 6 | 4 | 6 |   | 10 |
| John | Doe |   | 32 | 6 | 4 | 6 |   | 10 |

TABLE II.5C

| FN | LN | ST | DID | CITY | FN_Value Weight | LN_Value Weight | ST_Value Weight | CITY_Value Weight |
|---|---|---|---|---|---|---|---|---|
| John | Doe | Florida | 2 |   | 4 | 6 | 8 |   |
| John | Doe | Florida | 4 |   | 4 | 6 | 8 |   |
| John | Doe | Florida | 6 |   | 4 | 6 | 8 |   |
| John | Doe | Florida | 6 | Tampa | 4 | 6 | 8 | 9 |
| John | Doe | Florida | 6 |   | 4 | 6 | 8 |   |
| John | Doe | Florida | 7 | Orlando | 4 | 6 | 8 | 0 |
| John | Doe | Florida | 7 |   | 4 | 6 | 8 |   |

The technique may continue by merging the field value weights of the search results returned in Table II.5A, Table II.5B, and Table II.5C and generating a table of the largest field value weights for each non-DID field for each DID. The table may also include the total of the field value weights for each DID in the table. As previously discussed, and as illustrated in Table II.5A and Table II.5C, the search results returned from the fetch operations may be sorted by DID since the DID is strategically placed after the one or more fixed fields or one or more optional fields and before one or more extra credit fields. In various embodiments, the search results illustrated in Table II.5B may be sorted by DID prior to being merged.

It should be noted that a search result may be returned for an extra credit field whether or not the given search criterion associated with the extra credit field matches. In the event the given search criterion matches a field value associated with an extra credit field of a record in the database, the technique may count the field value weight associated with the extra credit field value toward the match score. In the event the given search criterion does not match a field value associated with an extra credit field of a record in the database, the technique may not count the field value weight associated with the extra credit field value toward the match score and may return a zero for the field value weight (e.g., the CITY_Value weight associated with the "Orlando" field value is returned as zero in Table II.5C since the field value "Orlando" does not match the "Tampa" search criterion). (In some embodiments, if there is a mismatch between an extra credit field value and the search criterion, then the field value weight for the extra credit field value is subtracted from the cumulative field value weight total.) Accordingly, in the record with DID 6, the extra credit field value (e.g., the city field value) may be counted towards the match score since the given criterion "Tampa" is a match. An exemplary table is produced below.

TABLE II.6

| DID | FN_Value Weight | MN_Value Weight | LN_Value Weight | AGE_Value Weight | CITY_Value Weight | ST_Value Weight | TOTAL |
|---|---|---|---|---|---|---|---|
| 2 | 4 | 5 | 6 | 0 | 0 | 8 | 23 |
| 4 | 4 | 5 | 6 | 10 | 0 | 8 | 33 |
| 6 | 4 | 5 | 6 | 10 | 9 | 8 | 42 |
| 7 | 4 | 5 | 6 | 0 | 0 | 8 | 23 |

At block 225, an identifier for an entity representation is identified and outputted. Accordingly, the technique may output a DID that corresponds to the given search criteria (e.g., {FN=John & MN=Ronald & LN=Doe & AGE=32 & CITY=Tampa & ST=Florida}) using techniques and methods described in Section I. That is, the records of Table II.6 may be sorted according to total field value weight, and the techniques of Section I may be applied to determine whether the first record matches the search criteria with a given confidence. If so, the associated DID may be returned as responsive to the search criteria.

It should be noted that returning search results based on a given query using one or more field match templates may be processed in parallel since a plurality of distributed tables associated with the one or more field match templates may be generated, distributed, and stored over one or more nodes according to techniques and methods described in reference to FIGS. 1 and 2 of the '866 applications. Accordingly, one or more search results may be fetched for each defined field match template in parallel.

According to an exemplary embodiment, a method for identifying an entity representation associated with a universal database that corresponds to a query associated with a foreign database is disclosed. The method includes selecting one or more field match templates. The method also includes providing the universal database, including one or more distributed tables, each distributed table being associated with a field match template and storing one or more records sorted in a list according to one or more fields of the field match template, where each record is associated with one or more entity representations. The method further includes receiving a query associated with a record in the foreign database. The method further includes comparing the query to the one or more distributed tables to identify an entity representation in the universal database that corresponds to the query. The method further includes outputting the identified entity representation.

An optional feature of the above embodiment includes that the selecting is based on at least one or more query logs associated with the universal database, where each field match template includes at least one of a fixed field portion, an optional field portion, and an extra credit field portion.

III. BATCH ENTITY REPRESENTATION IDENTIFICATION USING FIELD MATCH TEMPLATES

Techniques according to this section may match each record of a batch file to an individual represented in a universal (or other) database. Inputs to an embodiment according to this section may include, but are not limited to, a batch file and a universal (or other) database. The batch file may be part, all, or substantially all of a foreign (or other) database. An embodiment according to this section may compare the records of the batch file to the records of the universal database, and attempt to create matches between the records in the batch file and the entity representations or records in the universal database. An output of an embodiment according to this section may be a table that includes foreign record IDs of the batch file records, each in association with an entity representation of the universal database (e.g., using a DID). An embodiment according to this section may include a batch style processing of the records.

The batch file may contain one or more records associated with a foreign record ID, and may be an entire foreign database, or may be comprised of one or more records or one or more fields of the foreign database. The batch file may include records that are not complete (e.g., records that do not have data for every field), or erroneous (e.g., records that do not properly identify the same individual may, in fact, correspond to the same individual). Each record in the batch file may be associated with a foreign record ID. Non-limiting examples of such foreign record IDs are the RIDs discussed in the First Generation Patents And Applications.

The universal database may contain one or more records, each associated with a DID. The universal database, as with the batch file, may include records that are not complete, or may be erroneous. A further description of an exemplary universal database is provided in Section I, above.

The fields in the batch file may be compared to the one or more field match templates (discussed, e.g., above in Section II). If an entry (e.g., record) in the batch file does not have a corresponding field for a field match template field designated as fixed, then that entry may be discarded or ignored. As an example, in an exemplary first field match template containing fixed fields for first name ("FN") and state ("ST"), an exemplary second field match template containing fixed fields for last name ("LN") and ST, and an exemplary third field match template containing fixed fields FN and LN, if the batch file has corresponding fields for FN and LN, but does not have a corresponding field for ST, the exemplary first field match template and the exemplary second field match template may be discarded or ignored. In an alternate embodiment, the field match templates may be used, but if the batch file does not have a corresponding field for a field match template designated as fixed, that field may be ignored or temporarily or permanently removed from the field match template.

Figure 3A:
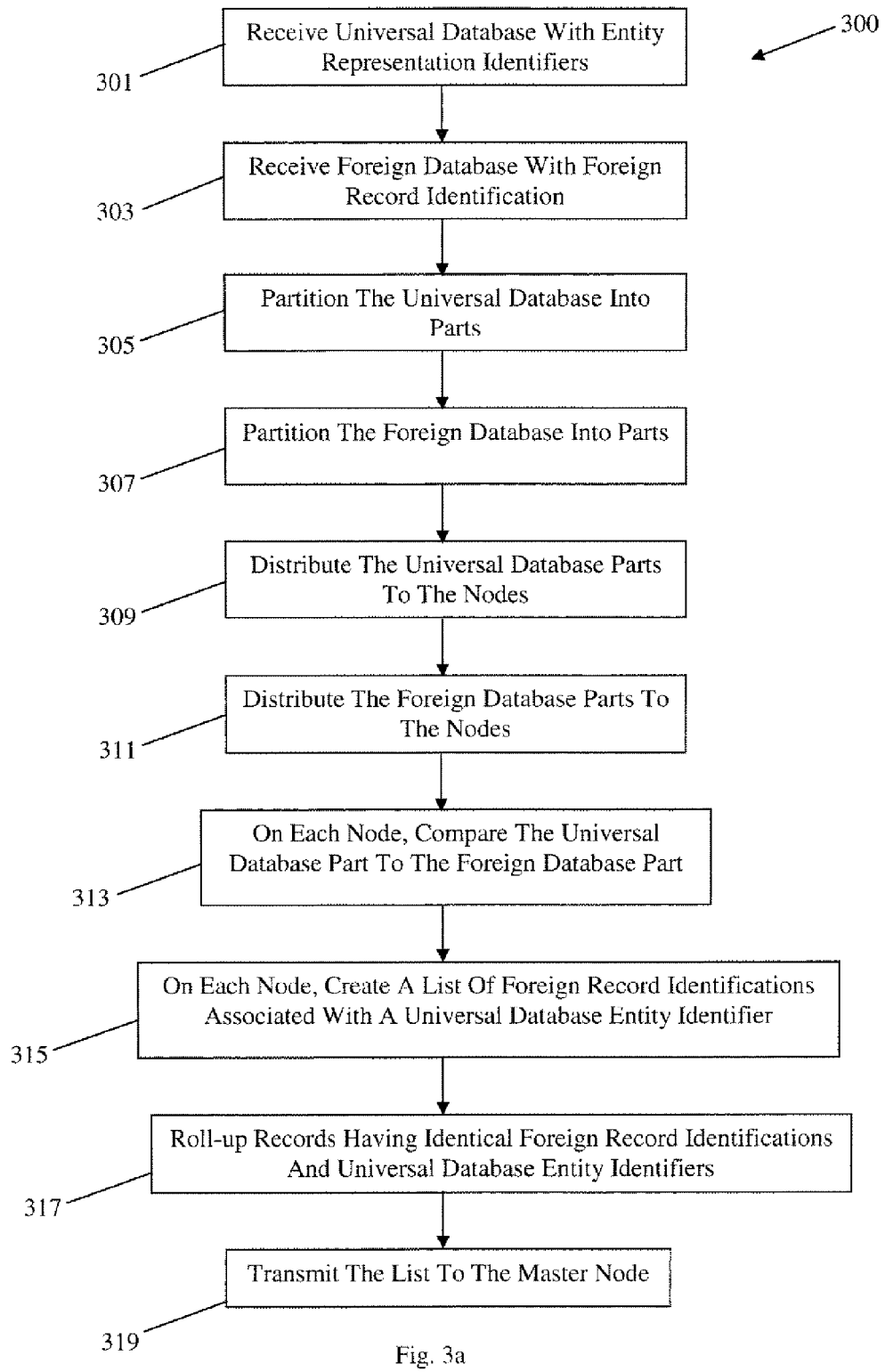
FIG. 3a is a flowchart depicting an embodiment of an invention of Section III.

Turning now to FIG. 3a, an exemplary flowchart 300 is shown depicting an embodiment of an invention of this section. One or more hardware nodes may be provided. The nodes may be as described in Section II, above, or may be as described in the First Generation Patents And Applications. A master node may be provided, which may control or otherwise provide instruction to the nodes. Shown in block 301, the master node may receive or be associated with the universal database. For example, the master node may be able to access and process the universal database. Shown in block 303, the master node may similarly be able to access and process the batch file.

The nodes may locally store one or more parts of the universal database, the batch file, or both. For example, each of the nodes may store one or more portions of the universal database related to each of the field match templates. The master node may initially distribute the universal database according to the methods described in the First Generation Patents And Applications, or the universal database may be distributed in another way. The master node may distribute the universal database by taking into account the fixed or optional fields in the field match template, so that searching or sorting may be executed across the nodes in a balanced or parallel manner. The distribution may occur before or after partitioning the universal database into one or more sections at one or more partition points, which may take into account the distribution of data according to a specific field match template. The partition points of the universal database may be different for each of the one or more field match templates. The individual nodes may create suggested partition points, based in part on the part of the universal database that is stored within the node. The nodes may transmit the suggestions to the master node, and the master node may create partition points based on the suggestions. The nodes may receive the partition points from the master node, and may reply with other suggested partition points, iterating the process one or more times.

Shown in block 305, once the appropriate field match template or templates are chosen, the partition points selected for the records contained within the universal database for one of the appropriate field match templates are utilized to partition the records from the universal database into one or more parts. Shown in block 309, the master node may transmit the partition points or information embodying the partition points to one or more of the one or more nodes. The one or more nodes may utilize the partition point information provided by the master node to communicate with one or more of the one or more other nodes, and may transfer portions of the universal database between themselves so that each node has a part of the universal database according to the partition points.

Figure 3B:
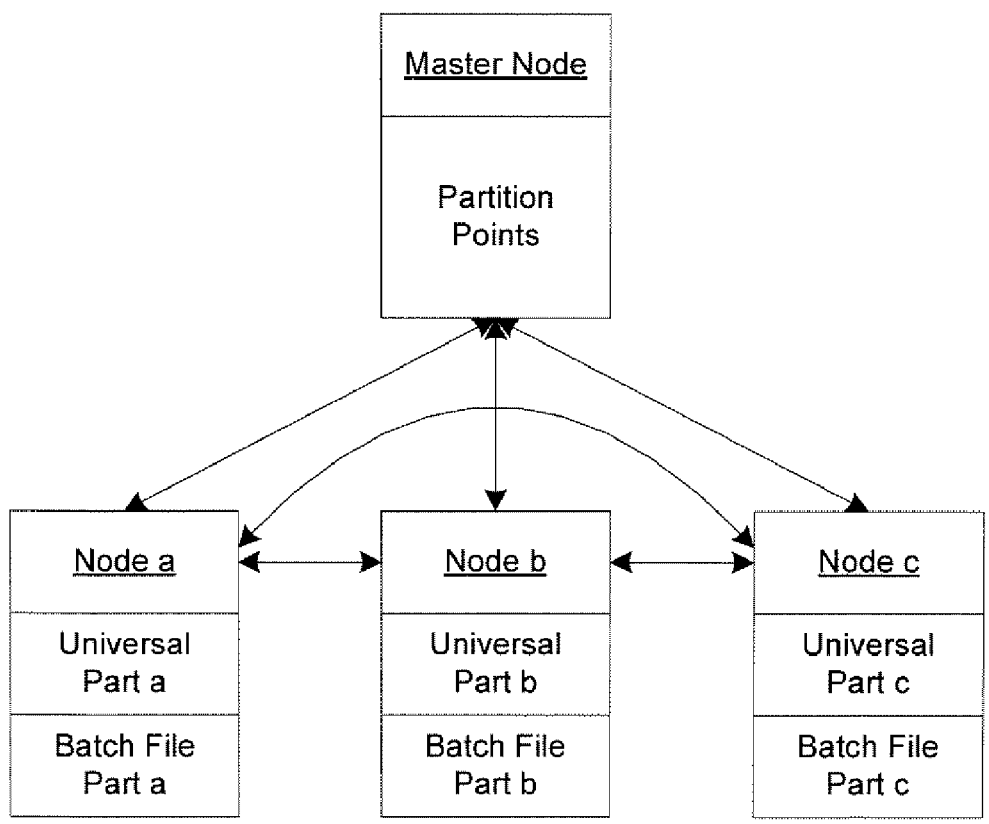
FIG. 3b is an exemplary network diagram depicting the partitioning of the batch file and the universal database into the one or more nodes according to an embodiment of an invention of Section III.
Figure 4:
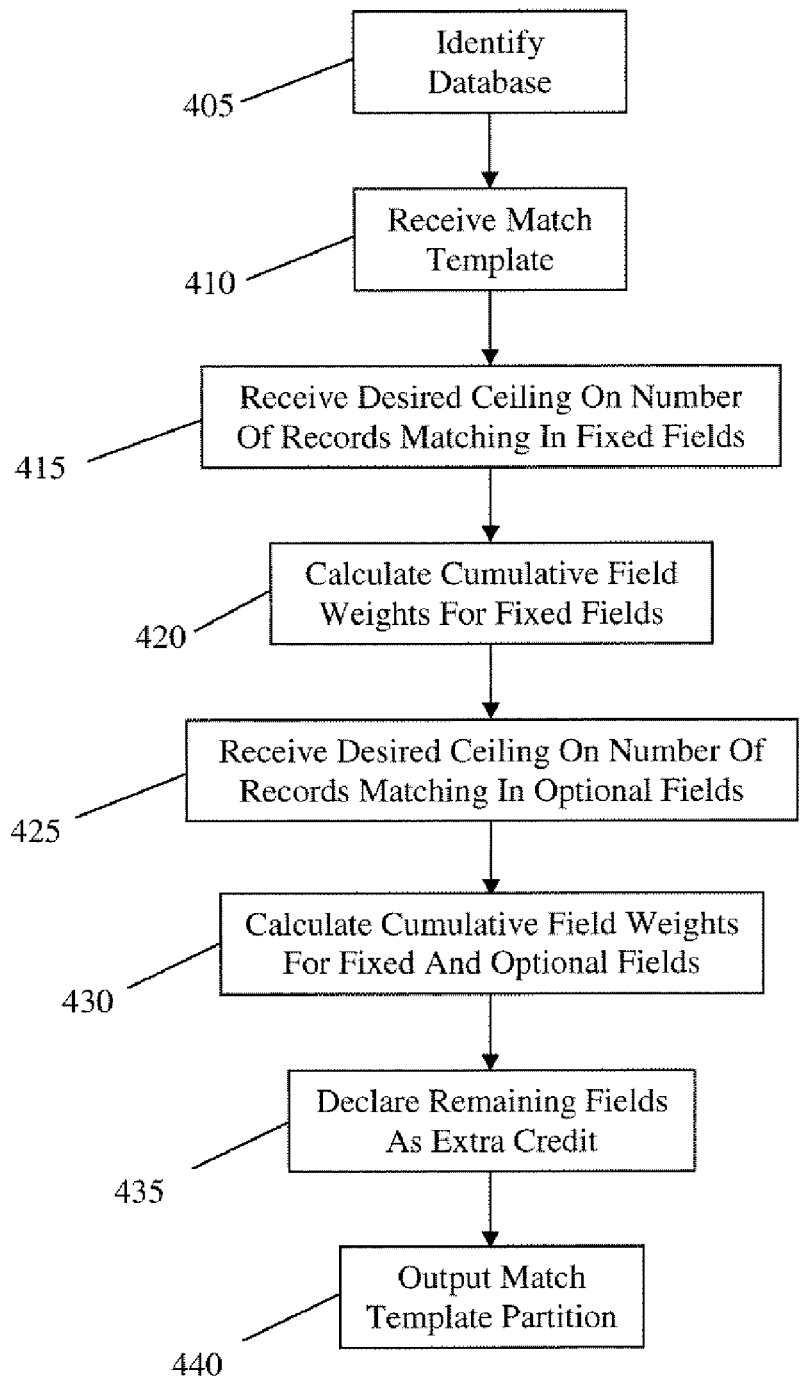
FIG. 4 is a flowchart depicting an embodiment of an invention of Section IV.

Shown in block 307, the master node and/or the nodes may also partition the batch file according to partition points. Such partition points may be, by way of non-limiting example, based on the first letter of a last name field (e.g., A-I, J-O, and P-Z). Other partition points based on other field values or criteria may be used in addition or in the alternative. In one exemplary embodiment, the partition points selected for the batch file are the same as the partition points selected for the universal database. The batch file may be partitioned into one or more parts according to the partition points, and, shown in block 311, the master node may transmit one or more parts of the batch file to one or more of the one or more nodes. The same partition points may be selected for partitioning both the universal database and the batch file so that, for example, a part of the batch file may contain records likely to be matched to the corresponding part of the universal database. In this way, the records to be matched between the batch file and the universal database may reside on the same node. Instead of attempting to search the entire universal database for records matching a specific record in the batch file, it may suffice to search a smaller part of the universal database. The universal database and the batch file may also exist on one node or master node, and may not be partitioned. The partitioning of the batch file and the universal database into the one or more nodes may be depicted as, by way of non-limiting example, FIG. 3b.

For purposes of discussion, a specific, non-limiting example of a universal database is presented below as depicted in Table III.1.

TABLE III.1

| DID | FN | MN | LN | AGE | CITY | ST |
|---|---|---|---|---|---|---|
| 1 | Jon | Ron | Doe | 39 | Miami | |
| 1 | Jon | | Doe | | | Florida |
| 2 | John | Ronald | Doe | | | Florida |
| 3 | Jack | Ron | Doe | 72 | | |
| 3 | Jack | Ronald | Doe | | Tampa | Florida |
| 3 | Jack | | Doe | 72 | | |
| 4 | John | Ron | Doe | | Tampa | |
| 4 | John | | Doe | 32 | | Florida |
| 4 | John | Ronald | Doe | | Tampa | |
| 5 | Jason | Rick | Doe | 31 | Orlando | |
| 5 | Jason | | Doe | 31 | | Florida |
| 6 | John | | Doe | 32 | | |
| 6 | John | Ron | Doe | | | Florida |
| 6 | John | | Doe | 32 | Tampa | Florida |
| 6 | John | Ron | Doe | | | Florida |
| 7 | John | Ronald | Doe | 21 | Orlando | Florida |
| 7 | John | | Doe | 21 | | Florida |
| 8 | Jack | Michael | Lee | 23 | Orlando | Florida |
| 9 | Jack | Thomas | Lee | 39 | Tampa | Florida |
| 89 | Ron | David | Smith | 39 | Tampa | Florida |
| 90 | Ron | David | Paul | 20 | Tampa | Florida |
| 91 | David | Joseph | Smith | | Tampa | Florida |
| 91 | David | | Smith | | Tampa | Florida |

Again for purposes of discussion, a specific non-limiting example batch file is presented below as depicted in Table III.2.

TABLE III.2

| Foreign Record ID | FN | MN | LN | AGE | CITY | ST |
|---|---|---|---|---|---|---|
| 37 | Jon | Ron | Doe | | | |
| 38 | John | Ronald | Doe | | Miami | Florida |
| 39 | Jack | Ronald | Doe | | | |
| 40 | Jon | | Doe | 32 | | Florida |
| 54 | Jason | | Doe | 31 | Orlando | |
| 68 | John | Ronald | Doe | | | |
| 85 | Jack | Mike | Lee | | Orlando | Florida |
| 96 | Jack | Thomas | Lee | 39 | | Florida |
| 784 | Ron | | Paul | | Tampa | |
| 785 | David | Joseph | Smith | | Tampa | Florida |
| 786 | David | Jackson | Smith | | Tampa | Florida |

For purposes of discussion, three field match templates are presented: Field Match Template A: (FN, MN, LN, DID) where all the non-DID fields of Field Match Template A are fixed fields; Field Match Template B: (FN, LN, MN, AGE, DID) where the first name field and the last name field of Field Match Template B are fixed fields and the middle name field and the age field of Field Match Template B are optional fields, and Field Match Template C: (FN, LN, ST, DID, CITY) where the first name field, last name field, and state field of Field Match Template C are fixed fields and the city field of Field Match Template C is an extra credit field.

According to the provisions of the First Generation Patents And Applications, any, or a combination, of the master node and the other nodes may set partition points for the universal database so that the universal database is divided into one or more parts, as depicted below. For example, the universal database and the batch file may be partitioned according to the "LN" field. FIGS. 11A, 11B and associated text of U.S. Pat. No. 7,293,024 to David Bayliss, et al. entitled "Method and System for Sorting and Distributing Data Among a Plurality of Nodes," issued Nov. 6, 2007, incorporated by reference herein show, in part, an embodiment of a method to partition data among one or more nodes. The universal database may be partitioned according to the one or more fields designated as fixed fields in a particular field match template.

From Table III.1, the universal database may be partitioned according to last name, yielding the following three parts:

TABLE III.3

| DID | FN | MN | LN | AGE | CITY | ST |
|---|---|---|---|---|---|---|
| 1 | Jon | Ron | Doe | 39 | Miami | |
| 1 | Jon | | Doe | | | Florida |
| 2 | John | Ronald | Doe | | | Florida |
| 3 | Jack | Ron | Doe | 72 | | |
| 3 | Jack | Ronald | Doe | | Tampa | Florida |
| 3 | Jack | | Doe | 72 | | |
| 4 | John | Ron | Doe | | Tampa | |
| 4 | John | | Doe | 32 | | Florida |
| 4 | John | Ronald | Doe | | Tampa | |
| 5 | Jason | Rick | Doe | 31 | Orlando | |
| 5 | Jason | | Doe | 31 | | Florida |
| 6 | John | | Doe | 32 | | |
| 6 | John | Ron | Doe | | | Florida |
| 6 | John | | Doe | 32 | Tampa | Florida |
| 6 | John | Ron | Doe | | | Florida |
| 7 | John | Ronald | Doe | 21 | Orlando | Florida |
| 7 | John | | Doe | 21 | | Florida |

TABLE III.4

| DID | FN | MN | LN | AGE | CITY | ST |
|---|---|---|---|---|---|---|
| 8 | Jack | Michael | Lee | 23 | Orlando | Florida |
| 9 | Jack | Thomas | Lee | 39 | Tampa | Florida |

TABLE III.5

| DID | FN | MN | LN | AGE | CITY | ST |
|---|---|---|---|---|---|---|
| 89 | Ron | David | Smith | 39 | Tampa | Florida |
| 90 | Ron | David | Paul | 20 | Tampa | Florida |
| 91 | David | Joseph | Smith | | Tampa | Florida |
| 91 | David | | Smith | | Tampa | Florida |

Table III.3 depicts an exemplary first part of a partition of the universal database depicted in Table III.1; Table III.4 depicts an exemplary second part of the same partition of the universal database depicted in Table III.1, and Table III.5 depicts an exemplary third part of the same partition of the universal database depicted in Table III.1. Node a, node b, and node c may rearrange the data contained within the individual nodes so that node a may contain the records of the first part of the universal database, node b may contain the records of the second part of the universal database, and node c may contain the records of the third part of the universal database.

The master node may also partition the batch file into one or more parts using the partition points created and used for the universal database and the field match template. The partitioning of the batch file may yield the following three parts:

TABLE III.6

| Foreign record ID | FN | MN | LN | AGE | CITY | ST |
|---|---|---|---|---|---|---|
| 37 | Jon | Ron | Doe | | | |
| 38 | John | Ronald | Doe | | Miami | Florida |
| 39 | Jack | Ronald | Doe | | | |
| 40 | Jon | | Doe | 32 | | Florida |
| 54 | Jason | | Doe | 31 | Orlando | |
| 68 | John | Ronald | Doe | | | |

TABLE III.7

| Foreign record ID | FN | MN | LN | AGE | CITY | ST |
|---|---|---|---|---|---|---|
| 85 | Jack | Mike | Lee | | Orlando | Florida |
| 96 | Jack | Thomas | Lee | 39 | | Florida |

TABLE III.8

| Foreign record ID | FN | MN | LN | AGE | CITY | ST |
|---|---|---|---|---|---|---|
| 784 | Ron | | Paul | | Tampa | |
| 785 | David | Joseph | Smith | | Tampa | Florida |
| 786 | David | Jackson | Smith | | Tampa | Florida |

Table III.6 is an exemplary first part of the batch file depicted in Table III.2; Table III.7 is an exemplary second part of the batch file depicted in Table III.2, and Table III.8 is an exemplary third part of the batch file depicted in Table III.2. Node a, node b, and node c may rearrange the data contained within the individual nodes so that node a may contain the records of the first part of the batch file, node b may contain the records of the second part of the batch file, and node c may contain the records of the third part of the batch file.

Within each node, the partition of the batch file may be joined with the partition of the universal database. Each join may use the table or partition generated by the field match template from the universal database, so as to include the records from the batch file that do not have null values in the fields which are denoted as fixed in the respective field match template. For example, in Table III.2 above, showing an exemplary batch file, and an exemplary field match template containing fixed fields "FN" and "ST," the following records may be selected for the join:

TABLE III.9

| Foreign record ID | FN | MN | LN | AGE | CITY | ST |
|---|---|---|---|---|---|---|
| 38 | John | Ronald | Doe | | Miami | Florida |
| 40 | Jon | | Doe | 32 | | Florida |
| 85 | Jack | Mike | Lee | | Orlando | Florida |
| 96 | Jack | Thomas | Lee | 39 | | Florida |
| 785 | David | Joseph | Smith | | Tampa | Florida |
| 786 | David | Jackson | Smith | | Tampa | Florida |

Shown in block 315, the output of the join may include a table associated with each node containing an entry for each of the records in part of the batch file associated with the node. The entries may contain the foreign record ID from the batch file, the DID from the universal database, and the score for each of the fields in the field match template. The table may be sorted according to DID and then foreign record ID, and the nodes may transmit records between themselves so that records for a given foreign record ID and DID are on the same node. Cumulative scores for the records may be calculated as discussed elsewhere herein. In the example shown below, a selection of exemplary records in the table created for the join of the first part of the universal database partition and the first part of the batch file partition on node a against a search criterion using techniques and methods described in Section I may appear as depicted in Table III.10. Note that all possible matches to the universal database are not shown; only a subset of the matches, including non-exclusive and exemplary matches for foreign record ID fields 37 and 38, are shown for exemplary purposes only.

TABLE III.10

| Foreign record ID | DID | FN Weight | MN Weight | LN Weight | AGE Weight | CITY Weight | ST Weight | Score |
|---|---|---|---|---|---|---|---|---|
| 37 | 1 | 5 | 6 | 4 | 0 | 0 | 0 | 15 |
| 37 | 1 | 5 | 0 | 4 | 0 | 0 | 0 | 9 |
| 37 | 2 | 0 | 0 | 4 | 0 | 0 | 0 | 4 |
| 37 | 4 | 0 | 6 | 4 | 0 | 0 | 0 | 10 |
| 37 | 4 | 0 | 0 | 4 | 0 | 0 | 0 | 4 |
| 37 | 4 | 0 | 0 | 4 | 0 | 0 | 0 | 4 |
| 38 | 2 | 5 | 6 | 4 | 0 | 0 | 3 | 18 |
| 38 | 6 | 5 | 0 | 4 | 0 | 0 | 0 | 9 |
| 38 | 6 | 5 | 0 | 4 | 0 | 0 | 3 | 12 |
| 38 | 6 | 5 | 0 | 4 | 0 | 0 | 3 | 12 |
| 38 | 6 | 5 | 0 | 4 | 0 | 0 | 3 | 12 |

The resulting records from each of the nodes may be re-partitioned across the nodes. The partition points may be determined by, for example, the foreign record ID. The new partitions may allow for a balanced processing and matching of the records. For example, by partitioning the records so that records having the same foreign record ID are on the same node, the nodes may be able to process the records without having to query other nodes for additional records. Shown in block 317, the resulting records having identical DID and foreign record ID fields may be consolidated or rolled-up, so that the field value weights for each of the fields are combined, creating a single record with a DID and foreign record ID, and combined scores for each of the fields. That is, the records may be merged according to DID. The combination may be an operation to take the highest weight value in each field to become the weight value of the field aggregation, or may be in the form of a summation, or may be an averaging of the records having identical DID and foreign record ID fields, or may be another mathematical operation to aggregate the records having identical DID and foreign record ID fields. The exemplary records returned from the join of the first part of the universal database and the first part of the batch file shown in Table III.10 may be combined so that the highest field value weight for each field for the records having identical DID and foreign record ID fields becomes the field value weight for the field of the combination. A portion of the resulting data is depicted in Table III.11, below.

TABLE III.11

| Foreign record ID | DID | FN Weight | MN Weight | LN Weight | AGE Weight | CITY Weight | ST Weight | Score |
|---|---|---|---|---|---|---|---|---|
| 37 | 1 | 5 | 6 | 4 | 0 | 0 | 0 | 15 |
| 37 | 2 | 0 | 0 | 4 | 0 | 0 | 0 | 4 |
| 37 | 4 | 0 | 6 | 4 | 0 | 0 | 0 | 10 |
| 38 | 2 | 5 | 6 | 4 | 0 | 0 | 3 | 18 |
| 38 | 6 | 5 | 0 | 4 | 0 | 0 | 3 | 12 |

The scores of each of the records returned from the table may then be considered to find probable matches according to the techniques of Section I, above. That is, within each set of records bearing the same foreign record ID, the techniques discussed above in relation to Equations 1-4 may be applied to decide whether the first record (sorted according to score) matches the search criteria with a known level of confidence.

Shown in block 319, the results from each node may be transmitted to the master node for further processing, or each node may output the results to a user. The master node may collect the tables from each of the nodes. The tables may be concatenated to form a larger table. These results may then be output to a user.

The above example is one embodiment of the techniques described in this section. Other embodiments may also utilize the techniques described in this section. For example, instead of distributing a universal database and a batch file to one or more nodes, a single node or system may be utilized to sort, merge, score, and/or output a combination of the universal database and the batch file. In another embodiment, if either the universal database or the batch file, or both, were not in a relational database model, and one or more field match templates were specified having at least one fixed field and zero or more optional and/or extra credit fields, the techniques described in this section may be utilized to sort the universal database or universal file by the fixed fields and the optional fields. The technique may then be used to sort the batch file according to the same fixed fields and optional fields, if the fixed fields and the optional fields exist in the batch file. If one or more of the fixed fields and/or optional fields do not exist in the batch file, the technique may be operable to ignore those fields in the field match template. The technique may process the universal database or universal file and the batch file sequentially, and may output a record in the universal file and a record in the batch file if the field values match according to the field value template. For example, a record in the universal file and the batch file may be output when the field values of the fields corresponding to the fixed fields of the field match template of the universal file match similar fields from the batch file. The technique may then filter the resultant record pairs according to the optional field or fields in the field match template. The fields that are output may be scored according to the techniques shown in sections I and II, above, and ordered by foreign ID and DID.

According to an exemplary embodiment, a method for comparing records from a batch file to a universal database is disclosed. The method includes providing a batch file, including one or more records, each record associated with a foreign record identification. The method also includes providing a universal database, including one or more records ordered so that the one or more records each are associated with one or more entity identifiers, each entity identifier associated with an individual. The method further includes comparing the batch file to the universal database to identify records. The method further includes creating a list of foreign record identifications, each associated with an entity identifier from the universal database and a linking score.

Various optional features of the above embodiment include the following. The method may include partitioning the universal database into a first plurality of parts across one or more nodes according to one or more partition points. The method may include partitioning the batch file into a second plurality of parts across one or more nodes according to one or more partition points.

IV. METHOD OF PARTITIONING MATCH TEMPLATES

Techniques according to this section may be used to determine how to account for field matches between given search criteria and records in a database. Such techniques allow for fuzzy matching of the given search criteria to the database being searched. Certain techniques according to this section may use match templates to partition a given search criteria into (1) fields that must be populated and match, referred to as "fixed" fields, (2) fields that must match if populated, referred to as "optional" fields, and (3) fields that need not match, but that are counted toward a match score if populated and a match or non-match occurs, referred to as "extra credit" fields. Section II contains further discussion of match templates and their field designations. The techniques of this section may be applied to the techniques of Sections II and III in order to determine where to partition a given match template into fixed, optional and extra credit fields. Although the techniques of this section are not limited to embodiments of the techniques presented in Sections II and III, the following discussion is, by way of non-limiting example, presented in reference to those sections.

In general, the techniques of this section may be applied to improve search processing speed. For example, the techniques of this section may be used to partition a given match template into fixed, optional and extra credit portions so as to establish bounds on data processing and transfer in performing a search. In general, for a given match template and search criteria, as more of the match template is designated as fixed, fewer records in the database will match. That is, designating a greater portion of a match template as fixed may reduce the number of records that are returned for further processing (e.g., processing one or more optional or extra credit search field values). Processing time for fixed fields is relatively short, as a single fetch may suffice to identify all records that match in the fixed field portion of a search template. In contrast, in some embodiments, the optional field portion of a match template may not be amenable to a single simple fetch command. Thus, in some embodiments, each record that has been determined to match the given search criteria in the fixed fields of the match template may be compared to the optional field values specified by the match template and search criteria. Accordingly, as more fields are specified as fixed, fewer comparisons are required for processing the optional fields, thus reducing the comparison computational burden. Records that match according to the optional search criteria (e.g., either the associated record field and search criterion match or one or both are null) are output for further processing of extra credit fields (if any). In some embodiments, each of the records returned from the optional field comparison operation are transferred for further processing, including the extra credit field values of those records. Thus, as less of a match template is designated as optional, more of the match template may be designated as extra credit, and more records will generally be returned and possibly be transferred between computation resources. Accordingly, each portion of a match template may implicate different amounts and types of processing. Techniques according to the present section may be used to designate fields in a match template as fixed, optional and extra credit in order to optimize or improve processing speed, reduce processing power, and reduce the number of records transferred between computational portions of a given hardware system.

Field probabilities and techniques for their computation are disclosed in the Second Generation Patents And Applications. In general, a field probability for a given field may be interpreted as a measure of diversity of field values that appear in the given field. That is, for a given database that includes a plurality of entity representations (or records), a field probability provides a measure of diversity of the field values that appear in the associated field among the entity representations (or records). (As discussed at length in the Second Generation Patents And Applications, a database may contain a plurality of records, entity representations, or a combination thereof. By way of illustration, the following discussion will utilize the term records without limiting the scope of application of the techniques of this section. That is, the techniques of this section may be applied to databases containing entity representations.) A field probability associated with a particular field in a record chosen at random from a database provides a probability that another randomly selected record will share the same field value in the particular field. Accordingly, the number of records in the database multiplied by a given field probability provides an estimate of the number of records in that database that are expected to include the same field value in the associated field as a record selected at random from the database. Put another way, the number of records in the database multiplied by a given field probability provides the expected size (i.e. expected value of the size) of a field value cohort of a record chosen at random.

As discussed in detail in the Second Generation Patents And Applications, the field probabilities (and field value probabilities) are each associated with a field weight (respectively, field value weight). Further, as discussed in detail in the Second Generation Patents And Applications, field weights and field value weights may be used instead of field probabilities and field value probabilities in order allow for certain computations to be performed additively instead of multiplicatively. Thus, field weights may be used according to the techniques of this section to estimate expected database portion sizes in a manner discussed above.

Techniques according to this section may utilize field weights to select portions of match templates as fixed, optional and extra credit. More particularly, by utilizing field weights according to the techniques presented in this section, the expected number of records returned as complying with each type of match template portion may be estimated. This estimation may be represented as, by way of non-limiting example:

$$w_{cumulative} = \log(U) - \log(S). \qquad \text{Equation 3}$$

In Equation 3, $w_{cumulative}$ represents an approximate bound on the cumulative sum of the field weights of the initial fields in a match template in order to limit the number of matching records to approximately S, where U is the size of the database. A specific example of applying the technique described above follows.

is a flowchart depicting an embodiment of an invention of Section IV. A discussion of an embodiment of the technique of this section in relation to a particular non-limiting match template and other parameters follows. At block 405, the relevant databases are identified. At block 410, a match template is received. Suppose by way of non-limiting example that the match template specifies the following fields in order: first name, last name, state, age and sex. In symbols, the match template may be represented as, by way of non-limiting example: (FN, LN, ST, AGE, SEX). Suppose further that each field has an associated field weight as presented in the following table.

TABLE IV.1

| | Field | | | | |
|---|---|---|---|---|---|
| | FN | LN | ST | AGE | SEX |
| Field Weight | 9 | 11 | 4 | 6 | 1 |

Again by way of non-limiting example, the match template may be partitioned with the fixed fields appearing first, followed by the optional fields, and then lastly the extra credit fields. In order to decide which fields should be declared as fixed, a user may specify a rough limit on the number of records in the database that are expected to match the fixed fields. That is, a user may specify a certain number of records that are expected to match fields declared as fixed, and the technique under discussion will output which fields should be declared as fixed in order to do so. For purposes of discussion, for the remainder of this example, the database will be assumed to contain one billion ("1 B") records. Now suppose that, per block 415, it is desired that about 1024 records should be returned as matching the search criteria in the fixed fields. At block 420, the cumulative field weights for the fixed fields are calculated. In the present example, the cumulative field weights for the fixed fields should sum to no more than, by way of non-limiting example, log(1 B)−log(1024)=30−10=20. As the field weights for the first two fields (EN and LN) sum to 20, these two fields may be declared as fixed. Accordingly, once the first two fields are selected as fixed, the number of records that may have their optional fields compared to the optional fields of the search criteria will be expected to be 1024. Thus, selecting a rough bound on the number of records that are expected to match in the fixed fields allows for placing a rough limit on the number of records whose optional fields will be compared to the optional fields of the search criteria, thereby limiting the expected comparison computational resources utilized.

At block 425, in order to decide which fields should be declared as optional, a user may specify a rough limit on the number of records in the database that are expected to match the optional fields. That is, a user may specify a certain number of records that are expected to match fields declared as optional, and the technique under discussion will output which fields should be declared as optional in order to do so. Now suppose that it is desired that about 16 records should be returned, on average, as matching the search criteria in the fixed and optional fields. At block 430, the cumulative field weights for the fixed and optional fields are calculated. In the present example, the cumulative field weights for the fixed and optional fields may sum to no more than, by way of non-limiting example, log(1 B)−log(16)=30−4=26. Because the sum of field weights for the first three fields of the match template (FN, LN, ST) is 24, which is less than 26, and because the sum of the field weights of the first four fields of the match template (FN, LN, ST, AGE) is 30, which is more than 26, the third field should be declared as optional. Accordingly, by declaring that the third field is optional, the number of records that are expected to match in the fixed and optional fields is about 16. Thus, the number of records that may be transferred between computational resources is limited by declaring that the third field is optional.

At block 435, the remaining fields of the match template may be declared extra credit. To conclude the example, once the first two fields of the match template have been declared fixed and the third field has been declared optional, the remaining fourth and fifth fields may be declared as extra credit. By limiting the fixed fields to the first two fields, the amount of computational comparisons is limited to about 1024. By limiting the optional field to the third field, the number of records that may be transferred is limited to about 16. Thus, by selecting approximate bounds on the number of records that are expected to match the fixed fields and the optional fields of a match template, the techniques of this section may be used to determine which fields in the match template should be declared as fixed, optional and extra credit in order to meet the selected bounds.

At block 440, the match template partition is output. The output may be to a user in a human readable form. Alternately, or in addition, the match template partition may be output to another computer in computer readable form. Alternately, or in addition, the match template partition may be transferred from one program module to another program module within the same computer or computer network. The receiving computer or program module may use the match template partition to identify entity representations as discussed in, e.g., Sections I-III of the present disclosure.

In some embodiments, the cumulative sums of the field weights in a given match template may be allowed to exceed the limit calculated according to Equation 3. In such embodiments, the first field whose weight causes the cumulative weight to exceed the calculated limit is declared as being in the fixed (respectively, optional) match template portion. In some embodiments, the cumulative sum that is nearest to the calculated limit is used to determine the included field. In such embodiments, if a cumulative sum is less than the calculated limit by a first number, and if including another field weight in the cumulative sum causes the cumulative sum to exceed the calculated limit by a second number, the associated field may be included or not in the fixed (respectively, optional) fields of the match template according to whether the first number is greater than or less than the second number.

In some embodiments, the techniques of this section may be applied to multiple match templates as part of the same process.

V. STATISTICAL MEASURE AND CALIBRATION OF INTERNALLY INCONSISTENT SEARCH CRITERIA WHERE ONE OR BOTH OF THE SEARCH CRITERIA AND DATABASE IS INCOMPLETE

Techniques according to this section may be used to determine whether there is a match to a given search criteria, where the given search criteria may contain two or more different field values for the same field. A search criteria that specifies two or more different field values for a single field is referred to herein as "internally inconsistent." Such search criteria may arise in a variety of situations. For example, such a search criteria may specify both a maiden and a married last name. As another example, an internally inconsistent search criteria may specify two different addresses for the same person, where it is suspected that the person has lived at both addresses at one time or another. In general, an information that may change for an individual may give rise to internally inconsistent search criteria. Techniques according to the present section may be used to process and determine matches for internally inconsistent search criteria.

The technique of the present section may be used in conjunction with a technique of any of other section included in this disclosure. In particular, the techniques of this section may be used as part of a search technique disclosed in any of Sections I, II or III. However, the techniques of this section are not limited to implementation in embodiments disclosed herein.

Figure 5:
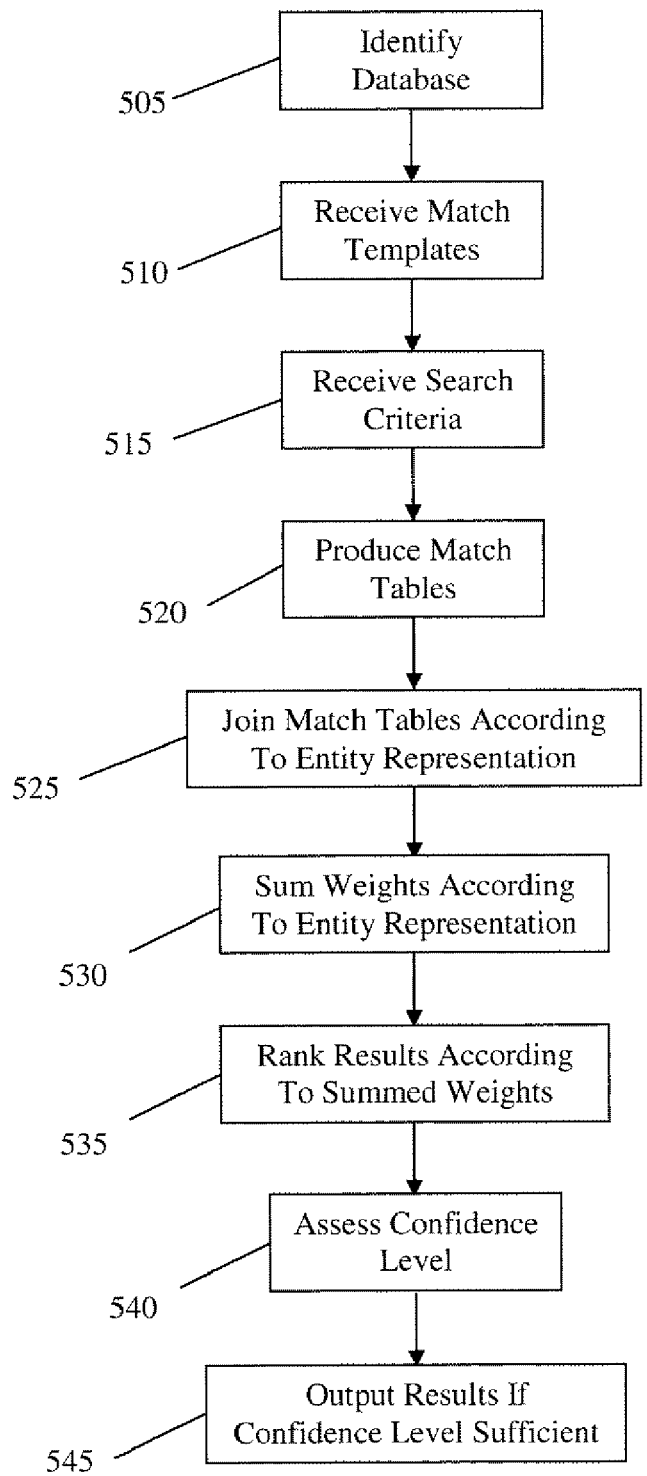
FIG. 5 is a flowchart depicting an embodiment of an invention of Section V.

FIG. 5 is a flowchart depicting an embodiment of an invention of this section. By way of non-limiting example, the embodiment is presented relative to the techniques of Section II; however, this presentation is exemplary only and not meant to be limiting. The present technique may be used with any of the embodiments discussed in Sections I-III, or with other embodiments. The discussion will proceed relative to the techniques of Section II, by way of non-limiting example. An embodiment according to this section is capable of accurately processing queries that include two (or more) different field values for a single field. (Embodiments allow for this to occur in more than one field; that is, more than one field value may be specified for more than one field.) The technique proceeds to generate results tables as discussed above. However, the results tables will include fields configured to contain the field values associated with the field value weights when more than one is specified in a search criteria. When the results are merged according to DID (or other individual identifier), both of the weights are taken into account by cumulative addition if they have not already been accounted for. Thus, the internally inconsistent search criteria are accounted for by both weight and field value.

More particularly, when merging a record into a cumulatively merged record, a decision is made as to whether a particular field value has already been accounted for in the cumulatively merged record. If so, the field value in the record to be merged has already been accounted for and therefore need not be merged. If not, then the field value weight is added to the cumulative sum and the field value is added to a list in the merged record that tracks which field values have been accounted for.

Relative to FIG. 5, a specific, non-limiting example is discussed presently. At block 505, a database in which the search will be conducted is identified. Such a database may be a universal database as discussed elsewhere herein. For purposes of discussion, a portion of a database with records containing a first name field ("FN"), a middle name field ("MN"), a last name field ("LN"), an age field ("AGE"), a city field ("CITY"), and a state field ("ST") is presented below.

TABLE V.1

| DID | FN | MN | LN | AGE | CITY | ST |
|---|---|---|---|---|---|---|
| 1 | Jane | Chris | Smith | 40 | Vero | FL |
| 1 | Jane | Chris | Doe | | Vero | FL |
| 2 | Jane | Chris | Smith | 21 | | FL |
| 2 | J. | C. | Smythe | | | |
| 3 | Jane | | Doe | | | FL |
| 4 | John | David | Doe | | | FL |

At block 510, one or more match templates is received. Again for the purposes of discussion and without limitation, three match templates may be used in this example.

(A) FN, MN, LN, where all fields are fixed;
(B) FN, LN, AGE, where FN and LN are fixed and AGE is optional; and
(C) LN, CITY, ST, where LN is fixed, CITY is optional and ST is extra credit.

At block 515, search criteria are received. Continuing this example, suppose that it is desired to search for a 40-year-old individual living in Vero, Fla. whose maiden name used to be Jane Chris Smith and whose married name is now Jane Chris Doe. The following search criteria may be used: FN=Jane, MN=Chris, LN=Smith, LN=Doe, AGE=40, CITY=Vero, ST=FL. Now, according to the techniques of Section II, each match template is used to compare the search criteria to the records in the database, represented here as Table V.1. Thus, at block 520, match tables are produced. The match templates accordingly produce the following tables (all weights are field value weights):

TABLE V.2

| DID | FN Weight | MN Weight | LN Weight | LN Field Value |
|---|---|---|---|---|
| 1 | 7 | 5 | 6 | Smith |
| 1 | 7 | 5 | 7 | Doe |
| 2 | 7 | 5 | 6 | Smith |

Table V.2 corresponds to match template (A) above.

TABLE V.3

| DID | FN Weight | LN Weight | LN Field Value | AGE Weight |
|---|---|---|---|---|
| 1 | 7 | 6 | Smith | 17 |
| 1 | 7 | 7 | Doe | |
| 3 | 7 | 7 | Doe | |

Table V.2 corresponds to match template (B) above.

TABLE V.4

| DID | LN Weight | LN Field Value | CITY Weight | ST Weight |
|---|---|---|---|---|
| 1 | 6 | Smith | 9 | 5 |
| 1 | 7 | Doe | 9 | 5 |
| 2 | 6 | Smith | | 5 |
| 2 | 6 | Smith | | |
| 3 | 7 | Doe | | 5 |
| 4 | 7 | Doe | | 5 |

Table V.4 corresponds to match template (C) above. At block 525, the match tables are joined according to entity representation. Accordingly, Tables V.1, V.2 and V.3 are merged to yield, by way of non-limiting example:

TABLE V.5

| DID | FN Weight | MN Weight | LN Weight | LN Field Value | AGE Weight | CITY Weight | ST Weight | Total Weight |
|---|---|---|---|---|---|---|---|---|
| 1 | 7 | 5 | 13 | Smith, Doe | 17 | 9 | 5 | 56 |
| 2 | 7 | 5 | 6 | Smith | | | 5 | 23 |
| 3 | 7 | | | 7 | Doe | | 5 | 19 |
| 4 | | | | 7 | Doe | | 5 | 12 |

At block 530, the weights are summed according to entity representation. Note that in Table V.5, once the two field values of "Smith" and "Doe" have been accounted for by inclusion into the LN Field Value field and by the sum of the associated field value weights appearing in the LN Weight field, these values need not be further accounted for. Thus, the two field values and weights are accounted for with the merging of Table V.2 according to DID. The LN field values of Tables V.3 and V.4 need not be additionally added. Next, at block 535, the table is sorted according to total weight. Because Table V.5 is already sorted by weight, the results remain the same in this example:

TABLE V.6

| DID | FN Weight | MN Weight | LN Weight | LN Field Value | AGE Weight | CITY Weight | ST Weight | Total Weight |
|---|---|---|---|---|---|---|---|---|
| 1 | 7 | 5 | 13 | Smith, Doe | 17 | 9 | 5 | 56 |
| 3 | 7 | 5 | 7 | Doe | | | 5 | 23 |
| 2 | 7 | | 6 | Smith | | | 5 | 18 |
| 4 | | | 7 | Doe | | | 5 | 12 |

At block 540, a confidence level of the accuracy of the highest ranked entity representation is assessed. Thus, the techniques of Section I may be applied to determine whether the first ranked record is indeed the correct record. For example, employing the techniques discussed in relation to Equation 1, the difference between the total weight for the first two records is 33, which is greater than, for example, −log(1−99.999%)=16. Therefore, according to the techniques of Equation 1, the first record in Table V.6 is the correct record with a confidence level of at least 99.999%.

At block 545, an identifier of the identified entity representation is output if the confidence level is sufficient. The output may be to a user in a human readable form. Alternately, or in addition, the entity representation identifier may be output to another computer in computer readable form. Alternately, or in addition, the entity representation identifier may be transferred from one program module to another program module within the same computer or computer network. Note that the entity representation identifier is not limited to a DID. Any identifier sufficient to identify the entity representation may suffice (e.g., a social security number).

An second exemplary embodiment is discussed presently. This second exemplary embodiment combines fuzzy matching techniques (e.g., those set forth in the Second Generation Patents And Applications in Section II) with the techniques of this section. For purposes of illustration rather than limitation, the second exemplary embodiment may utilize a symmetric and reflexive function (e.g., as discussed in Section III of the Second Generation Patents And Applications) to determine fuzzy matches. In particular, an edit distance function may be employed. Again for purposes of illustration rather than limitation, Hamming distance, denoted by "D," will be discussed in relation to the second exemplary embodiment of this section.

The second exemplary embodiment proceeds similarly to the first exemplary embodiment of this section, except that when combining records with the same DID (more generally, the same entity identifier), the maximum of the field value weights from among field values that lie within the fuzzy match is taken. Field value weights for field values that lie outside the fuzzy matching distance, but that match in the internally inconsistent portion of the search criteria, are added. These features are illustrated by a concrete example below.

For purposes of discussion of the second exemplary embodiment, a portion of a database with records containing a first name field ("FN"), a middle name field ("MN"), and a last name field ("LN") is presented below.

TABLE V.7

| DID | FN | MN | LN |
|---|---|---|---|
| 1 | Jeff | Clive | Smith |
| 1 | Jeffrey | Clive | Smith |

TABLE V.7-continued

| DID | FN | MN | LN |
|---|---|---|---|
| 1 | Clive | | Smith |
| 2 | Hans | C. | Anderson |

Field value weights may be associated to each field value in the table, by way of non-limiting example, by adding additional fields. In particular, for each first name field value, a field may be added and populated with field value weights for field values that lie within an edit distance of three (3) of the first name field value as determined by the edit distance function D. The resulting database portion may be represented as, by way of non-limiting example (all weights are field value weights):

TABLE V.8

| DID | FN | MN | LN | FN Weight | MN Weight | LN Weight | FN Weight For Edit Distance Of Three |
|---|---|---|---|---|---|---|---|
| 1 | Jeff | Clive | Smith | 6 | 10 | 6 | 2 |
| 1 | Jeffrey | Clive | Smith | 8 | 10 | 6 | 3 |
| 1 | Clive | | Smith | 10 | | 6 | 2 |
| 2 | Hans | C. | Anderson | 9 | 4 | 7 | 2 |

Continuing the discussion of the second exemplary embodiment, an internally inconsistent search criteria may be formed as, by way of non-limiting example: {FN=Jeffrey & FN=Clive & LN=Smith}. For an exemplary match template of (FN, LN) with both fields optional (again by way of non-limiting example) and the exemplary internally inconsistent search criteria, the following table may be produced when the search criteria is applied to the database portion of Table V.7.

TABLE V.9

| DID | FN Weight | FN Field Value | LN Weight | FN Weight For Edit Distance Of Three |
|---|---|---|---|---|
| 1 | | Jeff | 6 | 2 |
| 1 | 8 | Jeffrey | 6 | 3 |
| 1 | 10 | Clive | 6 | |

The fourth column of Table V.9 reflects, among other things, that the string "Jeff" is within an edit distance of three (3) of the strings "Jeff" and "Jeffrey". The second exemplary embodiment may proceed to combine the results reflected in Table V.9, as each result is associated with the same DID (more generally, the same entity identifier). Due to the presence of the fuzzy matching parameters, this combination proceeds in a different manner than that of the first exemplary embodiment of this section. Specifically, field values that are within the specified edit distance of each other are counted at most once, and the greatest field value weight between such field values is taken. Any remaining field value weights corresponding to matching field values that lie outside the specified edit distance are added. Thus, combining the first and second records reflected in Table V.9 above may yield, by way of non-limiting example:

TABLE V.10

| DID | FN Weight | FN Field Value | LN Weight | FN Weight For Edit Distance Of Three |
|---|---|---|---|---|
| 1 | 8 | Jeffrey | 6 | |

Table V.10 reflects that although the first two records of Table V.9 match the search criteria in the first name field, the first record requires the edit distance function to match, whereas the second record does not. Accordingly, the field value weight for the exact match is taken instead of the field value weight for the fuzzy match. Combining the third record with the records combined thus far as reflected in Table V.10 yields, by way of non-limiting example:

TABLE V.11

| DID | FN Weight | FN Field Value | LN Weight | FN Weight For Edit Distance Of Three |
|---|---|---|---|---|
| 1 | 18 | Jeffrey, Clive | 6 | |

Table V.11 reflects that for the first name match of "Clive" to the internally inconsistent search criteria, which is not yet reflected in the combined record of Table V.10 because "Clive" is not within an edit distance of three (3) of the FN field value already present in the combined record, the field value weight for "Clive" is added to the cumulative field value weight (namely, 8) computed thus far.

The sum total field value weights of the combined record of Table V.8 is 18+6=22. This score may be compared with other sum total field value weights from other records (not shown in the example) using the techniques of Section I in order to determine, with a known level of confidence, whether the records with DID of 1 in the database reflected in Table V.7 do indeed match the given search criteria.

VI. STATISTICAL MEASURE AND CALIBRATION OF REFLEXIVE, SYMMETRIC AND TRANSITIVE FUZZY SEARCH CRITERIA WHERE ONE OR BOTH OF THE SEARCH CRITERIA AND DATABASE IS INCOMPLETE

Techniques according to this section may be used to identify an individual in response to a query (e.g., by identifying a record or entity representation associated with such individual). Some embodiments may be implemented with respect to a database that contains a plurality of records, entity representations, or a combination thereof. Embodiments of the techniques of this section may receive a query that specifies or constrains the field values for one or more fields. In particular, such embodiments may account for near matches in one or more fields, where a near match is defined by a reflexive, symmetric and transitive relations, such as SOUNDEX. Such embodiments may proceed to identify the record or entity representation that most likely corresponds to individual identified by the query.

The present technique may use various measures of near match. That is, the present technique is not limited to a single measure of near matches between field values. Instead, any reflexive, symmetric and transitive function may be used to detect or measure similarity of field values. An example of such a function is SOUNDEX. The SOUNDEX function takes a string as an argument and outputs a code in standard format that provides an indication of the string's pronunciation. The output of the SOUNDEX function (or any other reflexive, symmetric and transitive function) may be referred to herein as a "code." Note that, in general, reflexive, symmetric and transitive functions define a partition of the domain over which the function operates, where the partition may be defined according to the codes assigned to elements of the domain by the function. That is, each part of the partition may be defined by a different code assigned only to the elements in that part by the function. The SOUNDEX function is reflexive because it produces the same code every time the same string is input. It is symmetric because if two strings produce the same code, they will produce the same code regardless as to the order of computation, i.e., regardless as to which string is fed into the SOUNDEX function first. The SOUNDEX function is transitive because if a first string and a second string produce the same code, and if the second string and a third string produce the same code, then the first string and the third string produce the same code.

As another example, the first initial function is reflexive, symmetric and transitive. This function, denoted here by F(•), takes as an input any string and outputs the first character of the string. Thus, for example, F(Chris)=C. The first initial function is reflexive because it produces the same code every time the same string is input. It is symmetric because if two strings produce the same code, they will produce the same code regardless as to the order of computation, i.e., regardless as to which string is fed into the first initial function first. The first initial function is transitive because if a first string and a second string produce the same code, and if the second string and a third string produce the same code, then the first string and the third string produce the same code. Thus, the first initial function is another non-limiting example of a function that may be implemented in the techniques of this section.

Note that the edit distance function is not transitive. For example, the edit distance between the strings "tape" and "tale" is one, and the edit distance between the strings "tale" and "tall" is one, but the edit distance between the string "tape" and "tall" is two, rather than one.

For the remainder of this section, the term D will denote a function with the appropriate properties, not limited to SOUNDEX or first initial. Note that unary functions or binary functions may be used with the present technique.

Near matches in one or more selected fields may be accounted for by replacing selected field values by codes generated by the function, with or without adding to each record new fields populated by the original contents of the selected field. Thus, in some embodiments, once the contents of the selected field are converted to their corresponding codes, the original contents of the selected field are added to a new field in each record.

Thus, for example, two records in a database may originally appear as, by way of non-limiting example:

TABLE VI.1

| First Name | Last Name |
|---|---|
| John | Smiff |
| Jon | Smith |

The last name may be selected for allowing for near matches. In such an example, the field values that appear in the last name field may be replaced with, by way of non-limiting example, SOUNDEX codes for the associated field values. As the SOUNDEX code for "Smith" is S530 and the SOUNDEX code for "Smiff" is S510, the altered table may appear as, by way of non-limiting example:

TABLE VI.2

| First Name | Last Name |
|---|---|
| John | S510 |
| Jon | S530 |

In Table VI.2, the last name field values are replaced with their SOUNDEX code. Any search criteria may thereafter be processed according to any of the techniques of Sections I-III. A near match between original field values may be detected and accounted for by detecting an exact match between codes and processed as discussed in any of Sections I-III.

Figure 6:
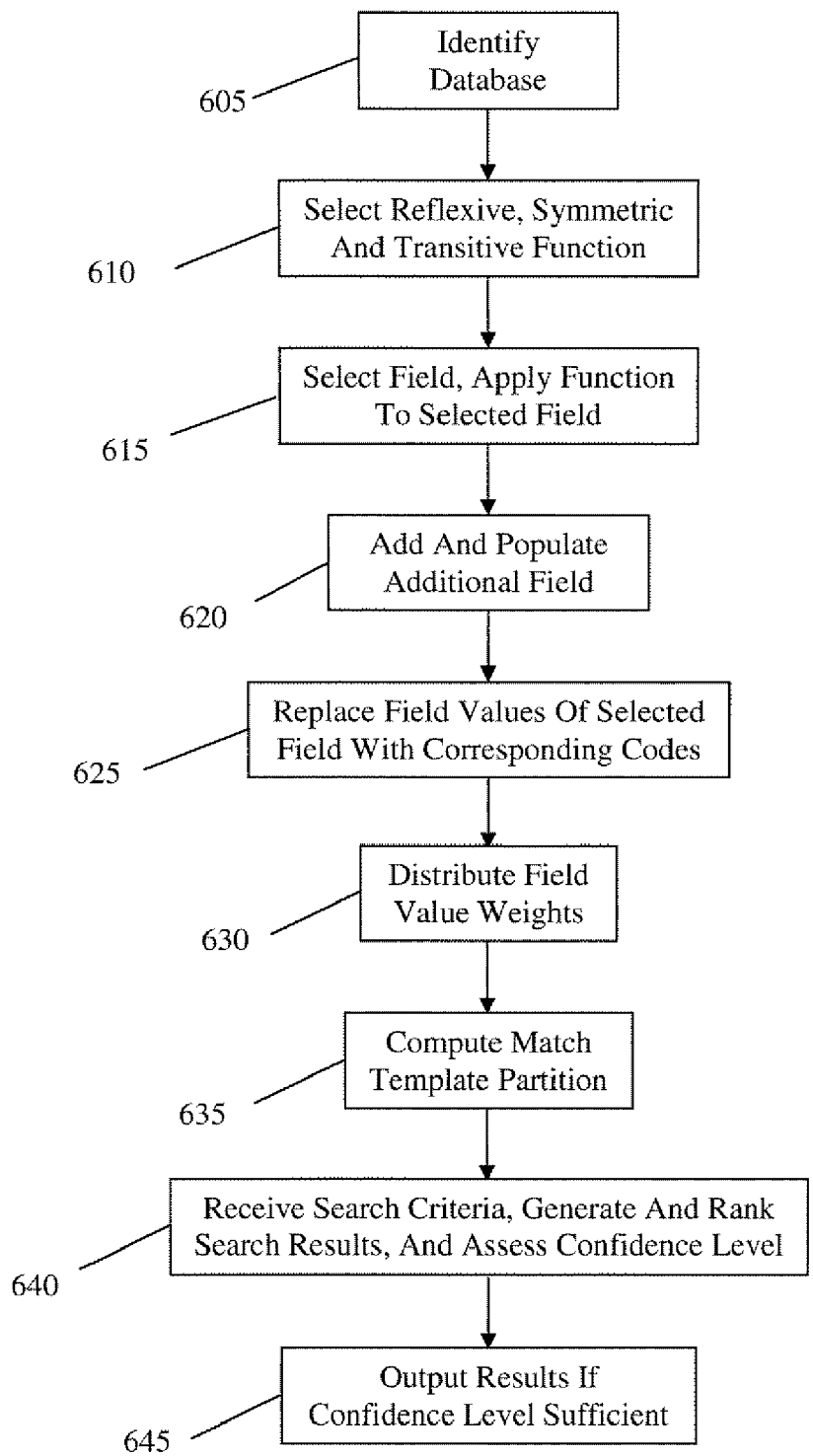
FIG. 6 is a flowchart depicting an embodiment of an invention of Section VI.

FIG. 6 is a flowchart illustrating an exemplary embodiment of this section. At block 605 a database is identified. At block 610 a symmetric, reflexive and transitive function is selected. At block 615, a field is selected, and the function is applied to the contents of such field in each record in the database. In this example, near matches in one or more selected fields are accounted for by conjoining to records one or more additional fields that store codes for the selected fields. Thus, at block 620, for the selected field, a corresponding additional field is appended to each record, and the contents of the selected field may be transferred to the added field. At block 625, the contents of the original field are be replaced by a code for the contents of the original field. At block 630, the field value weight for the contents of the original field may be spread across the original field and the added field. More particularly, the field value weight for the replacement field may be computed according to the codes contained therein, and the field value weight for the appended field may then be computed as the difference between the field weight for the original field and the field weight for the replacement field. These processes may be performed for more than one selected field. At block 635, a technique according to Section IV may be applied to compute (or re-compute) how a particular match template should be partitioned between fixed, optional and extra credit fields. At block 640, a search criteria is received, the techniques of any of Sections I-III may be applied in order to generate a list of records arranged by cumulative weight, and any of the techniques of Section I may be used to confirm that the highest-ranked record matches a given search criteria with a particular level of confidence. At block 645, an identifier of the highest ranked entity representation is output if the confidence level is sufficient.

A specific example is provided to illustrate an application of a technique according to the second exemplary embodiment. This example is presented relative to a selected match template for first name ("FN"), last name ("LN"), state ("ST"), age ("AGE") and sex ("SEX"). Thus, the match template mat be represented as, by way of non-limiting example: (FN, LN, ST, AGE, SEX). For a particular record, the field value weights for this match template are represented in the table below.

TABLE VI.3

| | Field | | | | |
|---|---|---|---|---|---|
| | FN | LN | ST | AGE | SEX |
| Field Value Weight | 10 | 15 | 6 | 4 | 1 |

In this example, it is desired to allow for near matches in the last name field. By way of non-limiting example, the selected reflexive, symmetric and transitive function that is used to gauge near matches may be SOUNDEX. The match template may accordingly be altered by appending a field configured to include the contents of the original last name field. The original first name field may be replaced by a field that contains a SOUNDEX code for last name. Thus, the altered match template may be represented as, by way of non-limiting example: (FN, LN_CODE, ST, AGE, SEX, LN). For the particular record, the field value weight for the field value in the replacement field may be computed and associated with the replacement field, and the field value weight for the field value in the appended last name field may be computed by subtracting the field value weight of the field value in the replacement field from the original field value weight for the field value in the last name field. For the particular record under discussion, the field value weights for the altered match template are represented in the table below.

TABLE VI.4

| | Field | | | | | |
|---|---|---|---|---|---|---|
| | FN | LN_CODE | ST | AGE | SE | LN |
| Field Value Weight | 10 | 8 | 6 | 4 | 1 | 7 |

Table VI.4 reflects that the field value weight for the last name code has been computed as eight (8). In this embodiment, this number is subtracted from the original field value weight for the last name field value (15), yielding five (7). The new field value weight for the last name field value is accordingly associated with the appended last name field.

At this stage, the technique of Section IV may be applied. For purposes of illustration and discussion, the field weights presented in Section IV in Table IV.1 are assumed to apply to the present example. As discussed in Section IV, for the original search template of (FN, LN, ST, AGE, SEX) with field weights as presented in Table IV.1, the first two fields were determined to be fixed, the third field was determined to be optional, and the remaining fields were determined to be extra credit. These determinations were made according to specified parameters of one billion records in the database, 1024 records returned on average as matching the search criteria in the fixed fields, and 16 records returned on average as matching the search criteria in both the fixed and optional fields. Continuing the example of this section, for purposes of discussion, it may be assumed that the field weight for the LN_CODE field is computed according to the techniques set forth in the Second Generation Patents And Applications as six (6). Then the field weights for the altered match template may be represented as in Table VI.5 below.

TABLE VI.5

| | Field | | | | | |
|---|---|---|---|---|---|---|
| | FN | LN_CODE | ST | AGE | SE | LN |
| Field Weight | 9 | 6 | 4 | 6 | 1 | 5 |

With the same parameters of one billion records in the database, 1024 records returned on average as matching the search criteria in the fixed fields, and 16 records returned on average as matching the search criteria in both the fixed and optional fields, by applying the techniques of Section IV to the altered match template of (FN, LN_CODE, ST, AGE, SEX, LN) with field values as reflected in Table VI.5, the following fields should be declared as fixed: FN, LN_CODE, ST and AGE. Similarly, the SEX field should be declared as optional, and the original LN field should be declared as extra credit. With this new match template, near matches in the last name field are accommodated in the replacement LN_CODE field, and exact matches, should they occur, are accounted for in the LN field appended at the end.

The revised match template (FN, LN_CODE, ST, AGE, SEX, LN) may then be used according to the techniques of any of Sections I-III in order to process a search criteria and locate a matching record with a specified confidence.

In an alternate embodiment, for an original field and a field containing a code, the highest field value weight (or field weight) may be selected for the purpose of calculating a cumulative score for a match between a given record and search criteria.

VII. ENTITY REPRESENTATION IDENTIFICATION USING ENTITY REPRESENTATION LEVEL INFORMATION

Techniques according to this section may be used to determine matches between entity representations in a universal and a foreign database (more generally, between any two databases). Note that, in general, an entity representation is one or more linked records that correspond to the same individual. Universal and foreign databases may contain entity representations rather than solely unlinked records. Techniques according to this section allow for matching one or more entity representations in a foreign database to the corresponding entity representation(s) in a universal database (more generally, and for the remainder of the discussion, between any two databases). Techniques according to this section may utilize a foreign database's entity representations, which generally contain more information than single unlinked records, as part of the match process. Accordingly, techniques according to this section may produce highly accurate results.

Exemplary techniques of this section may be applied to, for example, the techniques of Sections I-III. The techniques of those sections may, in some embodiments, match a query based on a record in a foreign database (Section II) or batch file containing records from a foreign database (Section III) to one or more entity representations in a universal database. According to the techniques of the present section, the techniques of Sections I-III may be altered as discussed presently to match a query that defines an entity representation in a foreign database (Section II) or a batch file that defines one or more entity representations in a foreign database (Section III) to one or more entity representations in a universal database, while taking into account the entity representation structure present in the foreign database. Although the techniques of this section are suitable for altering the embodiments of Sections I-III to account for foreign database entity representations, the techniques of this section are not so limited. That is, the techniques of this section may be applied to search techniques other than those presented in Sections I-III. For purposes of illustration rather than limitation, the techniques of this section are presented in reference to the techniques of Sections II and III.

Embodiments of this section as applied to the techniques of Section II are discussed presently. Such embodiments may receive as an input an identification of an entity representation in a foreign database and output an entity representation identification (e.g., a DID) for a matching entity representation in the universal database. That is, as applied to the techniques of Section II, a query identifying an entity representation in a universal database may be applied to a universal database in order to identify the entity representation in the universal database that matches the query. Moreover, the matching process may take into account the entity representation structure of the foreign database. Two different but related techniques may be applied to the techniques of Section II.

Figure 7A:
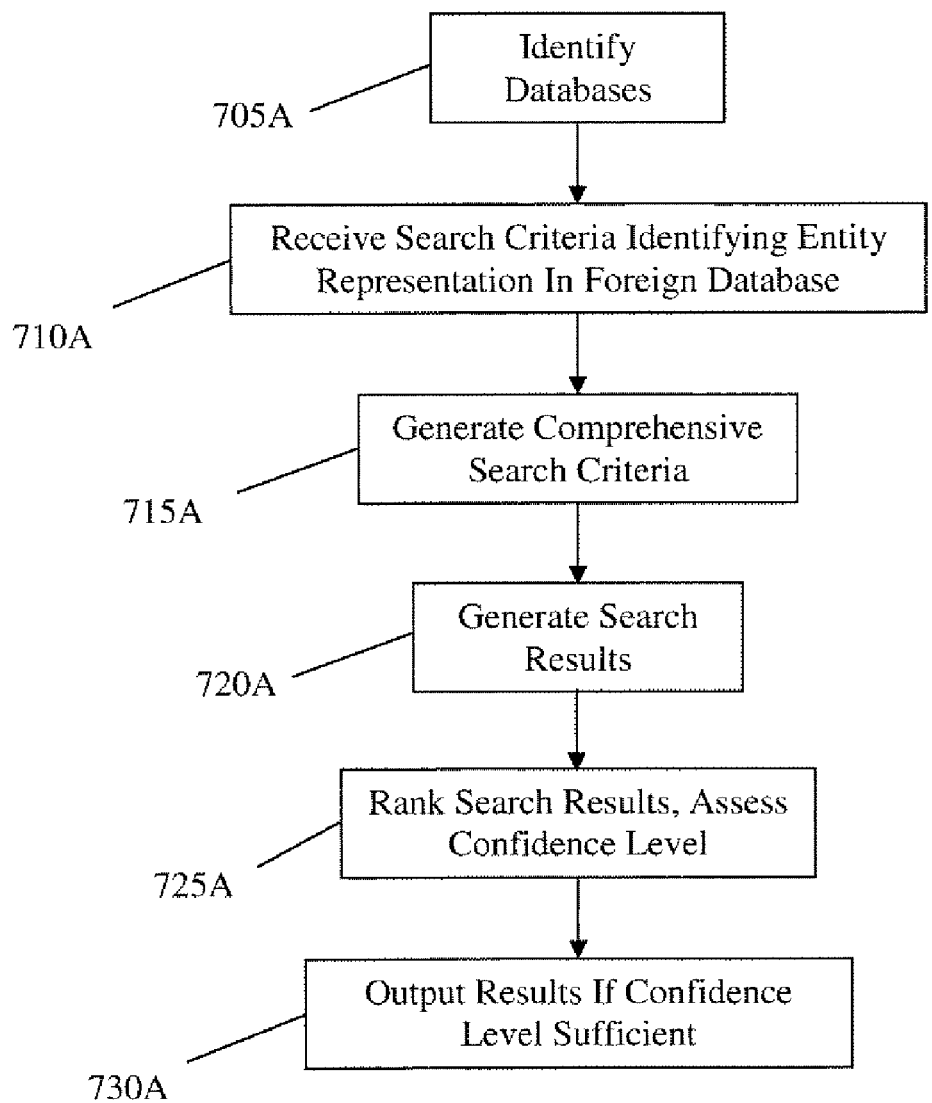
FIGS. 7A, B and C are flowcharts depicting embodiments of an invention of Section VII.

FIG. 7A is a flowchart depicting an embodiment of an invention of this section. As a first exemplary embodiment according to the techniques of this section and Section II, the process may proceed as follows. At block 705A, the relevant foreign and universal databases (by way of non-limiting example) are selected. Block 710A proceeds by identifying an individual reflected by at least one record in the foreign database. The process will output, with a known level of confidence, the DID or other identification of a corresponding entity representation in the universal database. Upon receiving an initial query or other search criteria specifying an entity representation in the foreign database, referred to herein as the "foreign entity representation," the exemplary embodiment proceeds, at block 715A, to generate a comprehensive query. The comprehensive query may specify all (or substantially all) features of the entity representation in the foreign database. In order to do so, the comprehensive query may be formed to include internally inconsistent search criteria as that term finds meaning in Section V above. More particularly, the comprehensive query may include search criteria for each field value that appears in the foreign entity representation, using, for example, the techniques of Section V if necessary. The query may then be processed according to the techniques of Sections II and V in order to identify a corresponding entity representation in the universal database. Thus, at block 720A, search results are generated using the aforementioned techniques, and at block 725A, the search results are ranked according to summed weight. At block 730A, an identifier (e.g., a DID) of the highest ranked search result is output if the confidence level is sufficient, as disclosed in Section I.

For example, a foreign entity representation may consist of the following records:

TABLE VII.1

| Foreign_DID | Foreign_RID | FN | MN | LN | AGE | CITY | ST |
|---|---|---|---|---|---|---|---|
| 7 | 126 | Mary | | Doe | | New York | NY |
| 7 | 12 | Mary | | Doe | | | |
| 7 | 248 | Mary | | Doe | 40 | | FL |
| 7 | 84 | Mary | Ann | Smith | | Tampa | FL |

As is apparent from an inspection of Table VII.1, each record bears the same foreign DID, hence, each record corresponds to the same individual. Note further that each record has a different foreign record identification. In Table VII.1, the heading "FN" corresponds to the first name field, "MN" corresponds to the middle name field, "LN" corresponds to the last name field, "AGE" corresponds to the age field, "CITY" corresponds to the city field, and "ST" corresponds to the state field. A user may input an initial query that specifies the foreign entity representation. By way of non-limiting example, the initial query may be of the form: {Foreign_DID=7}, intended to identify the foreign entity representation depicted in Table VII.1. A comprehensive query may then be constructed from the initial query. In this instance, the comprehensive query may be of the form: {FN=Mary & MN=Ann & LN-=Doe & LN=Smith & AGE=40 & CITY-New York & CITY=Tampa & ST=NY & ST=FL}. Note that this query includes at least three internally inconsistent search criteria, namely, those for fields LN, CITY and ST, as the foreign entity representation depicted in Table VII.1 contains records with multiple field values in these fields. The comprehensive query may then be processed according to the techniques of Section V (and a confidence calculated according to the techniques of Section I) in order to identify a matching entity representation in the universal database. Note that including, in the comprehensive query, every field value that appears in any record of the foreign entity representation allows for all information of the foreign entity representation to be used in detecting a match. (Note that in some embodiments, a portion of, or substantially all field values are included.)

Figure 7B:
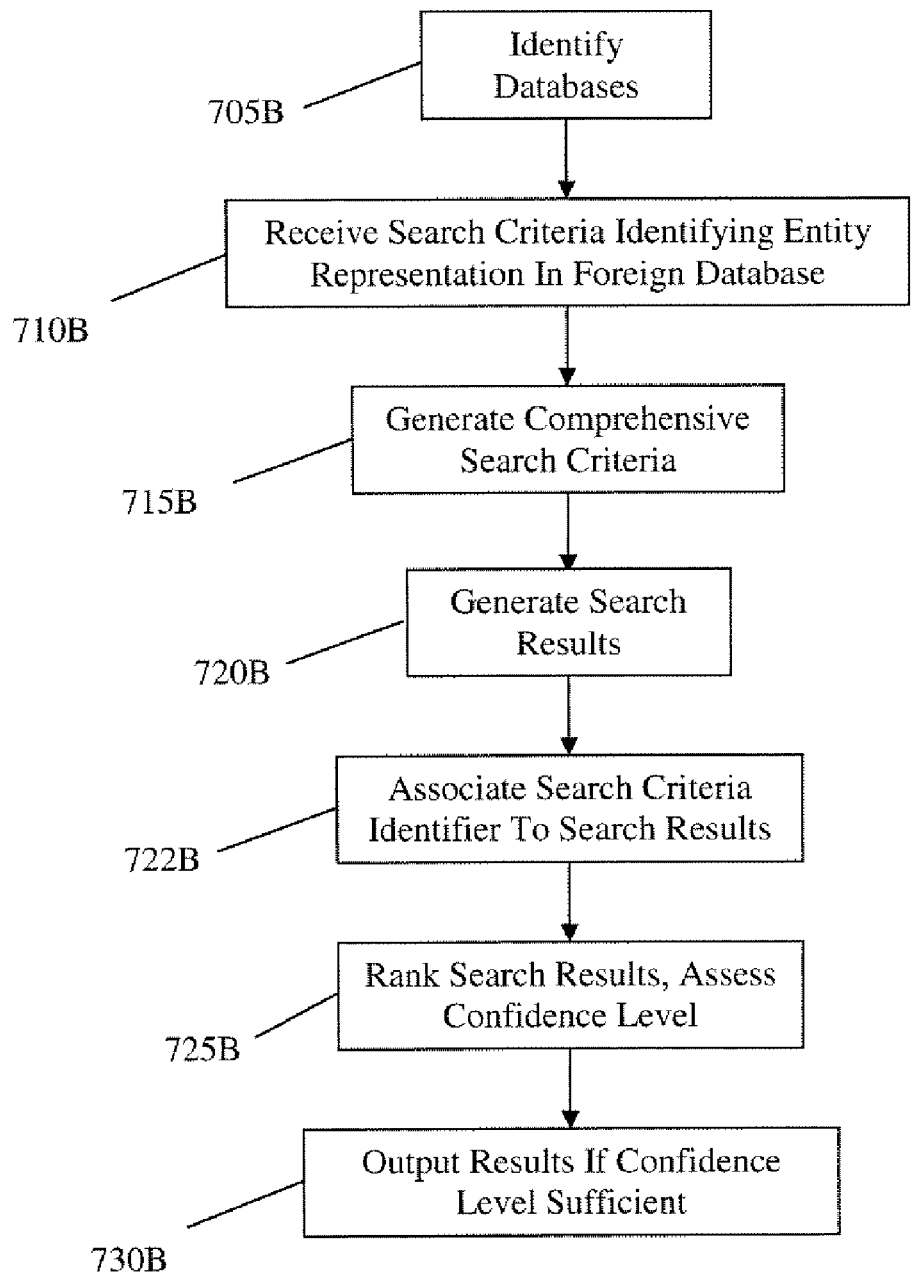

FIG. 7B is a flowchart depicting an embodiment of an invention of this section. As a second exemplary embodiment according to the techniques of this section and Section II, the process may proceed as follows. At block 705B, the relevant foreign and universal databases (by way of non-limiting example) are selected. Block 710B proceeds by identifying one or more individuals reflected by at least one record in the foreign database. The second exemplary embodiment may be thought of as incorporating batch processing into the first exemplary embodiment. Thus, more than one initial query may be submitted. In some embodiments, the technique waits until several queries are submitted and then processes them in batch mode. This may be accomplished by generating a comprehensive query for each initial query at block 715B, using, for example, the techniques of Section V to account for inconsistent field values. At block 720B, these multiple comprehensive queries may be processed according to the techniques of Section II in parallel, simultaneously, sequentially, or a combination thereof, to generate search results. Each comprehensive query is processed according to the first exemplary embodiment, except that at block 722B, a query identifier is appended to each result in order to specify which query it is responsive to. That is, each result record may be amended to include a query identifier. In some embodiments, queries are grouped according to foreign entity representations, and each group is processed in the same batch and given the same query identifier. The batch results may then be combined according to any of the techniques presented in Sections II or III above. At block 725B, the search results are ranked according to summed weight, and at block 730B, an identifier (e.g., a DID) of the highest ranked search result is output if the confidence level is sufficient, as disclosed in Section I.

Figure 7C:
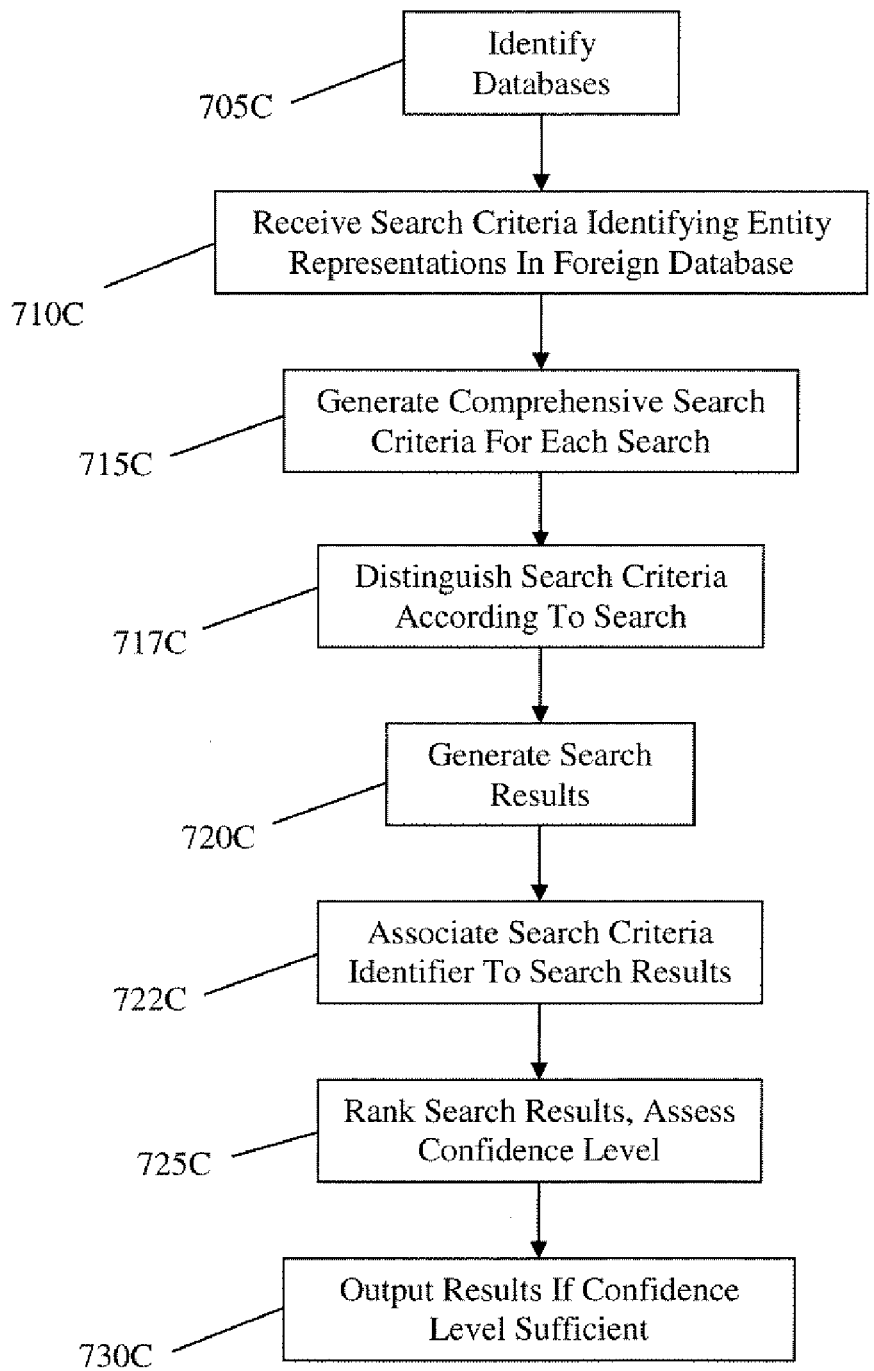

FIG. 7C is a flowchart depicting an embodiment of an invention of this section. That is, FIG. 7C depicts a third exemplary embodiment according to the techniques of this section and the techniques of Section III. In such an embodiment, one or more foreign entity representations are identified, and the embodiment proceeds to provide a corresponding set of entity representations from the universal database, where each identified entity representation corresponds to an entity representation in the provided set. This process may proceed as follows. At block 705I, the relevant foreign and universal databases (by way of non-limiting example) are selected. Block 710B proceeds by identifying one or more individuals reflected by at least one record in the foreign database. Once the foreign entity representations are identified (e.g., by identifying a list of one or more foreign DIDs), the embodiment may proceed to gather all foreign records that correspond to each foreign entity representation. Thus, for each identified foreign entity representation, all included records are grouped together to generate comprehensive search criteria at block 715C. Each of these groups may be included in a batch file, modified to distinguish the groups, and processed according to a technique of Section III. The modification may include adding a foreign entity representation identification (e.g., a foreign DID) to each record (block 717C) and is intended to allow each foreign entity representation to be handled as a group according to the techniques of Section III (block 720C). In some embodiments, each group of records that corresponds to the same foreign entity representation is modified by, in each record in the group, replacing the foreign record identification with the foreign DID. The foreign DIDs may then be handled according to the techniques of Section III as if they were foreign record identifications. The techniques of Section III may then be applied to identify the leading candidates from the universal database that correspond to each foreign record. At block 722C, the search results are each associated with an identifier of the search criteria for which they are associated. At block 725C, each set of search results is ranked according to summed weight, and at block 730C, an identifier (e.g., a DID) of the highest ranked search result for each set is output if the confidence level is sufficient, as disclosed in Section I.

For purposes of discussion and by way of non-limiting example, the third exemplary embodiment is applied here to the example presented in Section III. Table III.2 is modified by replacing foreign record IDs with foreign DIDs. Assuming for purposes of illustration that the records appearing in Table III.2 having foreign record IDs 37-40 and 68 are associated with a foreign entity representation having a foreign DID of 1, the record with foreign record ID of 54 is associated with a foreign entity representation having a foreign DID of 2, the records with foreign record IDs of 785 and 786 are associated with a foreign entity representation having a foreign DID of 3, the record with foreign record ID of 784 is associated with a foreign entity representation having a foreign DID of 4, and the remaining records are associated with a foreign entity representation having a foreign DID of 5, the modified Table III.2 may appear as, by way of non-limiting example:

TABLE VII.2

| Foreign Record ID (Substituted with foreign DIDs) | FN | MN | LN | AGE | CITY | ST |
|---|---|---|---|---|---|---|
| 1 | Jon | Ron | Doe | | | |
| 1 | John | Ronald | Doe | | Miami | Florida |
| 1 | Jack | Ronald | Doe | | | |
| 1 | Jon | | Doe | 32 | | Florida |
| 2 | Jason | | Doe | 31 | Orlando | |
| 1 | John | Ronald | Doe | | | |
| 5 | Jack | Mike | Lee | | Orlando | Florida |
| 5 | Jack | Thomas | Lee | 39 | | Florida |
| 4 | Ron | | Paul | | Tampa | |
| 3 | David | Joseph | Smith | | Tampa | Florida |
| 3 | David | Jackson | Smith | | Tampa | Florida |

The steps discussed in Section III may then be applied to the table as modified. Thus, field match templates and partitions may be utilized as described in Section III. Continuing the example that utilizes table VII.2 in place of Table III.2, intermediate Table III.10 as modified may appear, by way of non-limiting example, as follows.

TABLE VII.3

| Foreign record ID (Substituted with foreign DIDs) | DID | FN Weight | MN Weight | LN Weight | AGE Weight | CITY Weight | ST Weight | Score |
|---|---|---|---|---|---|---|---|---|
| 1 | 1 | 5 | 6 | 4 | 0 | 0 | 0 | 15 |
| 1 | 1 | 5 | 0 | 4 | 0 | 0 | 0 | 9 |
| 1 | 2 | 0 | 0 | 4 | 0 | 0 | 0 | 4 |
| 1 | 4 | 0 | 6 | 4 | 0 | 0 | 0 | 10 |
| 1 | 4 | 0 | 0 | 4 | 0 | 0 | 0 | 4 |
| 1 | 4 | 0 | 0 | 4 | 0 | 0 | 0 | 4 |
| 1 | 2 | 5 | 6 | 4 | 0 | 0 | 3 | 18 |
| 1 | 6 | 5 | 0 | 4 | 0 | 0 | 0 | 9 |
| 1 | 6 | 5 | 0 | 4 | 0 | 0 | 3 | 12 |
| 1 | 6 | 5 | 0 | 4 | 0 | 0 | 3 | 12 |
| 1 | 6 | 5 | 0 | 4 | 0 | 0 | 3 | 12 |

This table may be treated as discussed in Section III to yield a table to which the techniques of Section I may be applied to establish a confidence level that the first ranked entry corresponds to the search criteria. Table VII.4 below illustrates how Table III.1 would appear upon continuing the example under discussion with the techniques of this section applied to the example in Section III.

TABLE VII.4

| Foreign Record ID (Substituted with foreign DIDs) | DID | FN Weight | MN Weight | LN Weight | AGE Weight | CITY Weight | ST Weight | Score |
|---|---|---|---|---|---|---|---|---|
| 1 | 1 | 5 | 6 | 4 | 0 | 0 | 0 | 15 |
| 1 | 2 | 0 | 0 | 4 | 0 | 0 | 0 | 4 |
| 1 | 4 | 0 | 6 | 4 | 0 | 0 | 0 | 10 |
| 1 | 2 | 5 | 6 | 4 | 0 | 0 | 3 | 18 |
| 1 | 6 | 5 | 0 | 4 | 0 | 0 | 3 | 12 |

Although Table VII.4 illustrates only a single foreign entity representation, note that multiple foreign entity representations may be matched to multiple entity representations in the universal database. This table may be sorted according to score, and the techniques of Section I may be applied to each group of records having the same foreign record ID (substituted by foreign DIDs). Thus, each foreign entity representation will have an associated entity representation from the universal database and a known confidence level in the association. This information may be output in computer readable or human readable form.

Note that certain embodiments according to this section utilize the techniques of Section VI as applied to the reflexive, symmetric and transitive relation defined by the foreign entity representation identification. That is, the relation "has the same foreign entity representation identification" is reflexive, symmetric and transitive. Embodiments of the technique according to this section may be achieved by applying the techniques of Section V to such a relation and processing according to the techniques of Sections II or III to yield a table similar to Table VII.4. The techniques of Section I may be applied to such a table to identify the entity representations from the universal database that correspond to the input search criteria.

VIII. TECHNIQUE FOR RECYCLING MATCH WEIGHT CALCULATIONS

Techniques according to this section may be used to recycle computations performed in a database linking operation for use in a search operation. For example, techniques according to this section may allow field value weights computed as part of a database linking operation to be used in a search operation. The field value weights may be computed according to, by way of non-limiting example, an iterative process as discussed in detail in the Second Generation Patents And Applications. The search operation may be any of the search operations discussed herein in Sections I, II or III.

Certain embodiments disclosed in those sections utilize field value weights in order to perform a search operation. According to techniques of the present section, these weights need not be calculated from scratch. Instead, they may be efficiently derived from calculations performed when the database was iteratively linked in order to generate entity representations.

As discussed in detail in the Second Generation Patents And Applications, a database may undergo an iterative process in order to generate entity representations (i.e., records or linked collections of records that refer to the same individual). Although the present technique is not limited to the techniques of the Second Generation Patents And Applications, it will be discussed in reference thereto for convenience of discussion. Each iteration of a relevant iterative process may include some or all of the following: calculating field value probabilities, calculating field value weights, calculating field probabilities, calculating field weights, a linking process, a transitional linking process, a propagation operation, and a delinking operation. Each of these is discussed in detail in one or both of the First Generation Patents And Applications and the Second Generation Patents And Applications. In certain embodiments, when the database is initially populated with records, it undergoes multiple iterations of the iterative process in order to generate entity representations. Periodically (e.g., monthly), new records may be added to the database, and the database may be subjected to additional iterations.

As discussed in the Second Generation Patents And Applications, the field value weights may be stored in an auxiliary copy of the database. More particularly, each field value weight may be appended to its associated field value as it appears in the record. Thus, for example, for a record that includes a first name of John, a last name of Doe, and a city of Fort Lauderdale, where the first name of John has a field value weight of 8, the last name of Doe has a field value weight of 12, and the city of Fort Lauderdale has a field value weight of 7, these field value weights may be stored, by way of non-limiting example, as depicted in the following table.

TABLE VIII.1

| FN | LN | CITY |
|---|---|---|
| John 8 | Doe 12 | Fort Lauderdale 7 |

In some embodiments, these field value weights may be used as pan of a linking operation to create or consolidate entity representations. Exemplary techniques for doing so are discussed in detail in the Second Generation Patents And Applications. In some embodiments, the original database omits the field value weights being appended to the field values. In some embodiments, records in the original database are linked based on the field value weights stored in the auxiliary database.

Thus, in some embodiments, each iteration in the linking process may proceed by calculating field value weights and storing them in an auxiliary database and then performing a linking operation on the original database based on such weights. At the beginning of each iteration, the linkages reflected in the original database may be propagated over to the auxiliary database. Note that in such embodiments, the auxiliary database contains stale linkage information at the start of each iteration. That is, at the start of each iteration, the auxiliary database may contain field value weights that were used in the prior iteration to perform a linking operation in the original database, and after the linking operation, certain parameters used to compute the field value weights may have changed. Accordingly, in some embodiments, the field value weights are re-computed at the start of each iteration, stored in an auxiliary database, and then used to perform a linking operation in the original database, thereby rendering the field value weights stale in the sense that they no longer accurately reflect the newly-linked original database.

In some embodiments, once the database has undergone one or more linking operations as discussed above, search operations may be performed on the database. As discussed in Sections I-III herein, certain search operations may be performed using field value weights. Such search operation may be performed in a universal database and the search results utilized with respect to a foreign database. In some embodiments, the field value weights used in such search operations may be calculated from scratch after the database has undergone an iterative linking operation. In other embodiments, field value weights calculated as part of the iterative linking process may be recycled for use in search operations (e.g., search operations as discussed in Sections I-III above). These latter embodiments are discussed in detail presently.

According to techniques of this section, field value weight computed during an iterative linking operation may be recycled for use in search operations. An exemplary embodiment of this technique is discussed presently.

A technique for determining a sufficient (for the purpose of producing sufficiently accurate field value weights) number of iterations of an iterative linking process is presented. As discussed above and in the Second Generation Patents And Applications, each iteration of an iterative linking operation is expected to produce more accurate field value weights, until a point is reached where the field value weights stabilize such that further iterations do not result in further linkages and field value weights do not change. In some embodiments, the field value weights are said to substantially stabilize if their values do not change more than 10%. In other embodiments, such weights substantially stabilize if their values do not change more than 5%. In still other embodiments, if the field value weights do not change more than 1%, they are said to have substantially stabilized.

Relatively accurate results may be obtained by using field value weights calculated in an iteration prior to the iteration at which the weights stabilize. By way of non-limiting example, in some embodiments, the number of iterations may be log (U) where U is the number of records or entity representations in the database. In such embodiments, iterating the linking process log(U) times may produce sufficiently accurate field value weights. As another non-limiting example, in some embodiments, the number of iterations may be log(M) where M is the average number of records that correspond to the same individual. That is, M may be the average number of records that comprise an entity representation in a fully linked database. Here, the term "average" may be, by way of non-limiting example, a mode, mean or median. Thus, in some embodiments, iterating the linking process log(M) times may produce sufficiently accurate field value weights.

Note that although field value weights as computed by an iteration prior to the point at which the weights stabilize may be used, the iteration may continue until the stabilization point. That is, the linking operation iteration may continue after the field value weights are retrieved for use in a search operation.

Field value weights computed at any stage of a linking operation may be recycled for use in a search operation as follows. Once the field value weights are entered into an auxiliary database and the original database undergoes a linking operation based upon such field value weights, the original database may contain entity representations that differ from those in the auxiliary database. For example, the linking operation may have linked two entity representations that were previously unlinked. In the context of linkage using DIDs, prior to the linking, a first entity representation may be linked via DID=123 and a second may be linked via DID=456. After the linking, all records in the linked entity representation may share the same DID of, for example, 123. Further, it may be the case that no records with DID=456 exist once the linking operation occurs. Accordingly, it is possible that, after a given iteration, the original database and the auxiliary database contain different entity representations. This may be accounted for by updating the auxiliary database, which contains the field value weights, according to the links present in the original database. This process may be performed after any given iteration. The links of the auxiliary database may be updated by comparing entity representations in each database, and updating the links in the auxiliary database to conform to those present in the original database. Once the links in the auxiliary database are updated, the auxiliary database contains all information needed to locate field value weights associated with a given entity representation. These weights may then be used in search operations performed on either the original or the auxiliary database, for example, as discussed above in Sections I-III.

In some embodiments, no auxiliary database is utilized as part of a linking operation. In such embodiments, the field value weights computed at each iteration of the linking operation may be inserted into the original database or stored in a separate table. Further, in such embodiments, the weights computed at any stage of the iterative linking operation may be used in a search operation by retrieving such weights directly.

Figure 8:
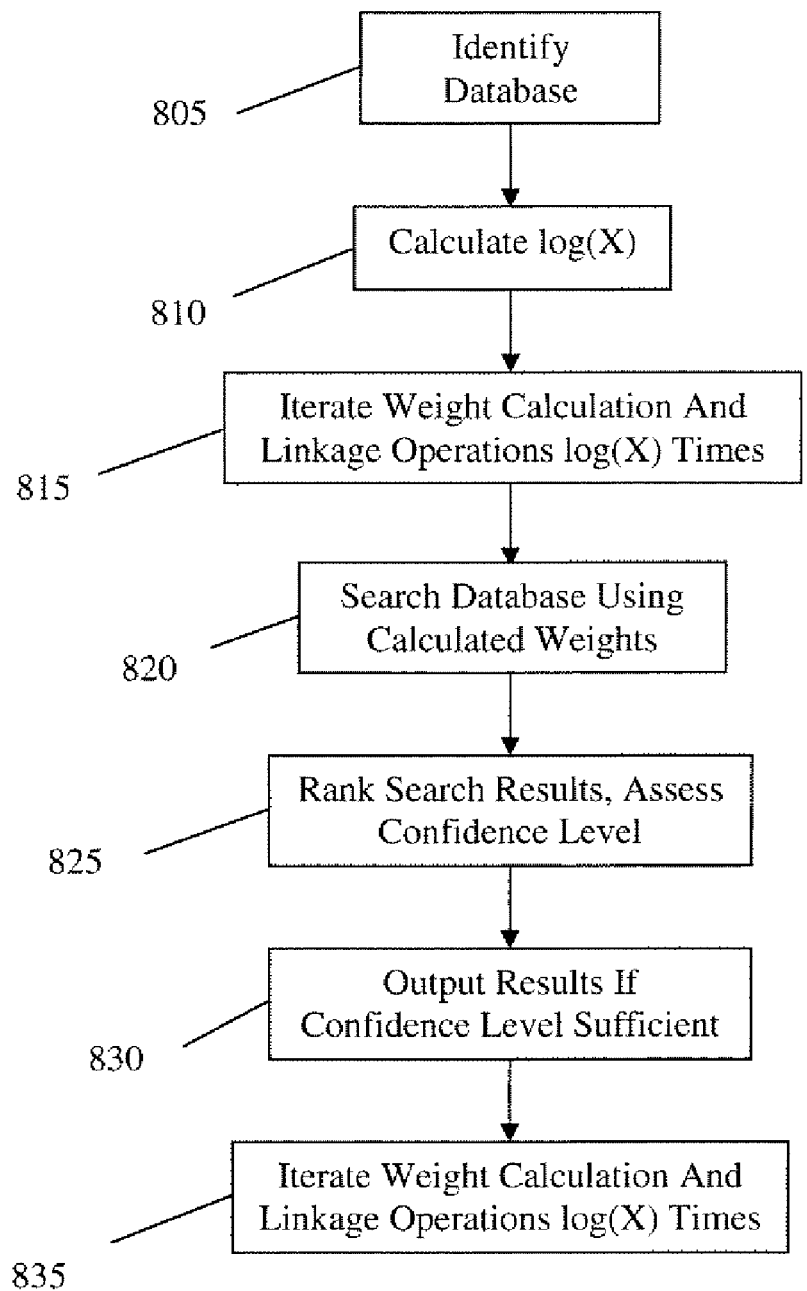
FIG. 8 is a flowchart depicting an embodiment of an invention of Section VIII.

FIG. 8 is a flowchart depicting an embodiment of an invention according to this section. At block 805, the relevant database is identified. At block 810, a logarithm of a parameter X is calculated. In some embodiments, the parameter X may be the total number of entity representations (including unlinked records) in the database. In other embodiments, the parameter X may be an average (e.g., mode, mean, median) number of records that comprise an entity representation in the database. This latter term may be computed relative to the database as it stands at any given time, or may be predicted as what would be reflected by a fully linked database (e.g., a database for which all records for each individual are linked).

At block 815, field value weights are calculated and the database undergoes a linking operation as described in, e.g., the Second Generation Patents And Applications. These operations are iterated a number of times. In some embodiments, the number of times is given by the logarithm of the parameter X. Note that a logarithm of the parameter X may not be a whole number. In such instances, the logarithm of the parameter X may be rounded up, rounded down, or rounded to the nearest integer. At block 820, once the linking operation is iterated, a search is performed according to the techniques discussed in any section of the present disclosure. At block 825, the search results are ranked according to summed weight, and at block 830 an identifier for the highest ranked result is output if a confidence level is sufficient. Block 835 reflects that iterating the linking operation may continue past the logarithm of the parameter X number of times.

According to an exemplary embodiment, a method of recycling match weights computed in a linking operation for use in a search operation, where the linking operation and the search operation are performed on a first database, the database including a plurality of records, is disclosed. The method includes computing, in an iterative process, a plurality of field value weights associated with field values present in at least some of the records, whereby the iterative process links at least some records of the database. The method also includes performing a search operation on the database, where the search operation utilizes the plurality of field value weights to identify at least one record identified by a search criteria, where the search criteria is derived from information contained in a second database, where substantially all individuals reflected in the second database are also reflected in the first database.

Various optional features of the above embodiment include the following. The plurality of field value weights may be computed prior to iteration N in the iterative process, where N is equal to a logarithm of a number of records in the database. The plurality of field value weights may be computed prior to iteration N in the iterative process, where N is equal to a logarithm of an average number of records in each entity representation in the database.

IX. CONCLUSION

Any of the techniques disclosed herein may be applied to a portion of a database as opposed to the entirety of a database.

The techniques discussed herein may be combined with any of the techniques disclosed in the First Generation Patents And Applications, the Second Generation Patents and Applications, and the '866 applications. The inventors explicitly consider such combinations at the time of filing the present disclosure.

The equations, formulas and relations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

Certain embodiments of the inventions disclosed herein may output any information contained in any record in a database.

Embodiments, or portions of embodiments, disclosed herein may be in the form of "processing machines," such as general purpose computers, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. In particular, the hardware described in the First Generation Patents And Applications may be used for any embodiment disclosed herein. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two or more pieces of equipment in two different physical locations. The two or more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

What is claimed is:

1. A method of identifying a universal entity representation in an electronic universal database that corresponds to a foreign entity representation in an electronic foreign database, each entity representation comprising a plurality of linked records, each record comprising a plurality of fields, each field capable of containing a field value, each field value associated with a field value weight, the method comprising:

provinding an electronic universal database that comprises a plurality of entity representations, wherein each of the plurality of entity representations comprises a plurality of linked records, each record comprises a plurality of fields, each field is capable of containing a field value, at least one field containing a field value, and each field value is associated with a field value weight, at least two different field values for a same field in the electronic universal database having different field value weights;

constructing a plurality of field match templates each comprising one or more field portions, wherein at least one field match template comprises a fixed field portion, an optional field portion, and an extra-credit field portion, the fixed field portion designating at least one field of a record as fixed, the optional field portion designating at least one field of a record as optional, the extra-credit field portion designating at least one field of a record as extra-credit, wherein an arbitrary record is considered to match an arbitrary query because:

a fixed field of the arbitrary record is populated with a field value that matches a corresponding fixed field value of the arbitrary query, and an optional field of the arbitrary record is populated with one of a null field value and a field value that matches a corresponding optional field value of the arbitrary query;

providing a plurality of distributed tables, each distributed table being associated with a field match template and storing a plurality of records sorted in a list according to a plurality of fields of the corresponding field match template, wherein each record is associated with one or more entity representations;

receiving, using a computing apparatus, a query identifying or constraining a plurality of field values, the query associated with a record in the foreign database;

comparing, using a computing apparatus, the query to a plurality of field values of the plurality of fields of the plurality of distributed tables to identify an entity representation in the universal database that corresponds to the query based on field designations specified by the corresponding field match templates, wherein the comparing comprises determining a highest ranked entity representation according to summed field value weights for field value matching the query based on field designations specified by the corresponding field match templates; and outputting, using a computing apparatus, an identifier for the identified entity representation.

2. The method of claim 1, wherein the constructing is based on at least one or more query logs associated with the universal database.

3. The method of claim 1, wherein a null field value of an extra-credit field of a record is not counted toward a match score.

4. The method of claim 1, wherein a field value of an extra-credit field of a record that does not match a corresponding extra-credit field value of a query is not counted toward a match score.

5. The method of claim 1, wherein a field value of an extra-credit field of a record that matches a corresponding extra-credit field value of a query is counted toward a match score.

6. The method of claim 1, wherein each field match template comprises a definitive identifier field.

7. The method of claim 6, wherein the definitive identifier field is positioned after the fixed field portion of each field match template.

8. The method of claim 6, wherein the definitive identifier field is positioned after the optional field portion of each field match template.

9. The method of claim 6, wherein the definitive identifier field is positioned before the extra credit field portion of each field match template.

10. The method of claim 1, wherein the step of comparing further comprises calculating a confidence level reflecting a likelihood that the highest ranked entity representation corresponds to the query.

11. The method of claim 10, wherein the step of outputting further comprises outputting, if the confidence level exceeds a predetermined threshold, an identifier for the highest ranked entity representation.

12. A system of identifying a universal entity representation in an electronic universal database that corresponds to a foreign entity representation in an electronic foreign database, each entity representation comprising a plurality of linked records, each record comprising a plurality of fields, each field capable of containing a field value, each field value associated with a field value weight, the system comprising:
  a computing apparatus configured to provide the electronic universal database that comprises a plurality of entity representations, wherein each of the plurality of entity representations comprises a plurality of linked records, each record comprises a plurality of fields, each field is capable of containing a field value, at least one field containing a field value, and each field value is associated with a field value weight, at least two different field values for a same field in the electronic universal database having different field value weights;
  a computing apparatus configured to construct a plurality of field match templates each comprising one or more field portions, wherein at least one field match template comprises a fixed field portion, an optional field portion, and an extra-credit field portion, the fixed field portion designating at least one field of a record as fixed, the optional field portion designating at least one field of a record as optional, the extra-credit field portion designating at least one field of a record as extra-credit, wherein an arbitrary record is considered to match an arbitrary query because:
    a fixed field of the arbitrary record is populated with a field value that matches a corresponding fixed field value of the arbitrary query, and
    an optional field of the arbitrary record is populated with one of a null field value and a field value that matches a corresponding optional field value of the arbitrary query;
  a computing apparatus configured to provide a plurality of distributed tables, each distributed table being associated with a field match template and storing a plurality of records sorted in a list according to a plurality of fields of the corresponding field match template, wherein each record is associated with one or more entity representations;
  a computing apparatus configured to receive a query identifying or constraining a plurality of field values, the query associated with a record in the foreign database;
  a computing apparatus configured to compare the query to a plurality of field values of the plurality of fields of the plurality of distributed tables to identify an entity representation in the universal database that corresponds to the query based on field designations specified by the corresponding field match templates, wherein the comparing comprises determining a highest ranked entity representation according to summed field value weights for field value matching the query based on field designations specified by the corresponding field match templates; and
  outputting, using a computing apparatus, an identifier for the identified entity representation.

13. The system of claim 12, wherein the constructing is based on at least one or more query logs associated with the universal database.

14. The system of claim 12, wherein a null field value of an extra-credit field of a record is not counted toward a match score.

15. The system of claim 12, wherein a field value of an extra-credit field of a record that does not match a corresponding extra-credit field value of a query is not counted toward a match score.

16. The system of claim 12, wherein a field value of an extra-credit field of a record that matches a corresponding extra-credit field value of a query is counted toward a match score.

17. The system of claim 12, wherein each field match template comprises a definitive identifier field.

18. The system of claim 17, wherein the definitive identifier field is positioned after the fixed field portion of each field match template.

19. The system of claim 17, wherein the definitive identifier field is positioned after the optional field portion of each field match template.

20. The system of claim 17, wherein the definitive identifier field is positioned before the extra credit field portion of each field match template.

21. The system of claim 12, wherein the computing apparatus is further configured to compare by calculating a confidence level reflecting a likelihood that the highest ranked entity representation corresponds to the query.

22. The system of claim 21, wherein the computing apparatus is further configured to output by outputting, if the confidence level exceeds a predetermined threshold, an identifier for the highest ranked entity representation.

* * * * *